(12) United States Patent
Allen et al.

(10) Patent No.: US 6,836,736 B2
(45) Date of Patent: Dec. 28, 2004

(54) DIGITAL CLAY APPARATUS AND METHOD

(75) Inventors: Mark Allen, Atlanta, GA (US); Wayne J. Book, Atlanta, GA (US); Imme Ebert-Uphoff, Roswell, GA (US); Ari Glezer, Atlanta, GA (US); David W. Rosen, Marietta, GA (US); Jaroslaw R. Rossignac, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 211 days.

(21) Appl. No.: 10/164,888

(22) Filed: Jun. 7, 2002

(65) Prior Publication Data

US 2003/0004657 A1 Jan. 2, 2003

Related U.S. Application Data

(60) Provisional application No. 60/296,938, filed on Jun. 8, 2001.

(51) Int. Cl.[7] .............................................. G06F 15/00
(52) U.S. Cl. ......................................... 702/45; 264/401
(58) Field of Search ........................... 702/45, 11, 155, 702/159; 356/375; 264/401

(56) References Cited

U.S. PATENT DOCUMENTS

| | | | |
|---|---|---|---|
| 4,575,330 A | 3/1986 | Hull | 425/174.4 |
| 4,929,402 A | 5/1990 | Hull | 264/22 |
| 5,123,734 A | 6/1992 | Spence et al. | 336/121 |
| 5,133,987 A | 7/1992 | Spence et al. | 427/53.1 |
| 5,174,931 A | 12/1992 | Almquist et al. | 264/22 |
| 5,344,298 A | 9/1994 | Hull | 425/135 |
| 5,545,367 A | 8/1996 | Bae et al. | 264/401 |
| 5,556,590 A | 9/1996 | Hull | 264/401 |
| 5,597,520 A | 1/1997 | Smalley et al. | 264/401 |
| 5,665,401 A | 9/1997 | Serbin et al. | 425/174.4 |
| 5,777,342 A | 7/1998 | Baer | 250/492.2 |
| 5,814,265 A | 9/1998 | Hull | 264/401 |
| 5,840,239 A | 11/1998 | Partanen et al. | 264/401 |
| 5,870,307 A | 2/1999 | Hull et al. | 364/474.24 |
| 6,027,324 A | 2/2000 | Hull | 425/174.4 |
| 6,103,176 A | 8/2000 | Nguyen et al. | 264/401 |
| 6,132,667 A | 10/2000 | Beers et al. | 264/401 |
| 6,207,097 B1 | 3/2001 | Iverson | 264/401 |

FOREIGN PATENT DOCUMENTS

| | | | |
|---|---|---|---|
| EP | 1024459 A2 | 8/2000 | G06T/17/00 |
| EP | 1025981 A2 | 8/2000 | B29C/67/00 |

OTHER PUBLICATIONS

Eden Tan Master's Report "Estimating Human Tactile Resolution Limits for Stimulator Design," Dept. of Engineering & Computer Science, Univ. of California, Berkeley, CA, May 1995.

(List continued on next page.)

*Primary Examiner*—Kamini Shah
(74) *Attorney, Agent, or Firm*—Thomas, Kayden, Horstemeyer & Risley, L.L.P.

(57) ABSTRACT

A system and method for controlling the surface and/or volume of a digital clay device is provided. One embodiment, among others, is a method comprising the following steps: determining a desired position of a skeleton structure portion residing in the digital clay device, determining a volumetric change of fluid residing in a bladder, the determined volumetric change corresponding to the determined desired position of the skeleton structure portion, opening a micro-electro mechanical systems (MEMS) valve so that the fluid flows through the MEMS valve thereby causing the determined volumetric change of the fluid, and adjusting a position of the skeleton structure portion corresponding to the desired position of the skeleton structure portion, the position adjustment caused by a force generated by the bladder on the skeleton structure portion when the volume of the bladder changes in response to the determined volumetric change.

42 Claims, 11 Drawing Sheets

OTHER PUBLICATIONS

G. Moy, C Wagener, R. S. Fearing, "A Compliant Tactile Display for Teletaction," Dept. of Electrical Engineering & Computer Science, Univ. of California, Berkeley, CA, Apr. 2000.

G. Moy, R. S. Fearing, "Effects of Shear Stress in Teletaction and Human Preception," Dept. of Electrical Engineering & Computer Science, Univ. of California, Berkeley, CA, Nov. 1998.

K. Miura, H. Furuya, "Variable Geometry Truss and Its Application to Deployable Truss and Space Crane Arm," Acta Astronautica, vol. 12, No. 7/8, pp. 599–607, Feb. 1985.

P. C. Hughes, W. G. Sincarsin, K. A. Carroll, "Trussarm —A Variable–Geometry–Truss Manipulator," Journal of Intelligent Material Systems and Structure, vol. 2, pp., 148–160, Apr. 1991.

G. S. Chirikjian, J. W. Burdick, "Design and Experiments with a 30 DOF Robot," IEEE, 1993.

E. J. Nicolson, R. S. Fearing, "The Reliability of Curvature Estimates from Linear Elastic Tactile Sensors," 1995 IEEE Int'l. Conf. on Robotics and Automation, Nogoya, Japan, 1995.

K. Salisbury, D. Brock, T, Massie, N. Swarup, C. Ziles, "Haptic Rendering: Programming Touch Interaction with Virtual Objects," 1995 Symposium on Interactive 3D Graphics, Monterey, CA, Apr. 1995.

R. D. Howe, W. J. Peine, D. A. Kontarinis, J. S. Son, "Remote Palpation Technology," IEEE Engineering in Medicine and Biology, pp. 318–323, May 1995.

I. Ebert–Uphoff, G. S. Chirikjioan, "Inverse Kinematics of Discretely Actuated Hyper–Redundant Manipulators Using Workspace Densities," 1996 IEEE Int'l. Conf. On Robotics and Automation, Minneapolis, MN, Apr. 1996.

R. M. Voyles, Jr., G. Fedder, P. K. Khosla, "Design of a Modular Tactile Sensor and Actuator Based on an Electrorheological Gel," 1996 IEEE Int'l. Conf. on Robotics and Automation, Minneapolis, MN, Apr. 1996.

D. A. Lawrence, C. D. Lee, L. Y. Pao, R. Y. Novoselov, "Shock and Vortex Visualization Using a Combined Visual/Haptic Interface," Proceedings 1997 Symposium on Interactive 3D Graphics, Providence, RI, Apr. 1997.

L. D. Cutler, B. Frölich, P. Hanrahan, "Two–Handed Direct Manipulation on the Responsive Workbench," Proceedings 1997 Symposium on Interactive 3D Graphics, Providence. RI, Apr. 1997.

T. V. Thompson, II, D. E. Johnson, E. Cohen, "Direct Haptic Rendering of Sculptured Models," 1997 Symposium on Interactive 3D Graphics, Providence, RI, 1997.

P. S. Wellman, W. J. Peine, G. E. Favalora, R. D. Howe, "Medanical Design and Control of a High–Bandwidth Shape Memory Alloy Tactile Display," 1997 Int'L. Symposium on xperimental Robotics, Barcelona, Spain, 1997.

W. J. Peine, P.S. Wellman, R. D. Howe, "Temporal Bandwidth Requirements for Tactile Shape Displays," Proceedings of the ASME Dynamic Systems and Control Division, SC–Vol 61,1997.

D.T.V. Pawluk, C. P. van Buskirk, J. H. Killebrew, S. S. Hsiao, K. O. Johnson, "Control and Pattern Specification for a High Density Tactile Display," ASME IMECE Haptics Symposium, Anaheim, CA, 1998.

G. S. Chirikjian, I. Ebert–Uphoff, "Numerical Convolution on the Euclidean Group with Applications to Workspace Generation," IEEE Transactions on Robotics and Automation, vol. 14, No. 1,1998.

T. Yoshikawa, A. Nagura, "A Three–Dimensional Touch/Force Display System for Haptic Interface," Proceedings of the IEEE Int'l. Conf. on Robotics & Automation, Detroit, MI, May 1999.

P. Kammermeier, M. Buss, G. Schmidt, "Dynamic Display of Distributed Tactile Shape Information by Prototypical Actuator Array," Proceedings of the IEEE/RSI Int'l. Conf. on Intelligent Robots and Systems, 2000.

J. A. Carretero, K. S. Breuer, "Measurement and Modeling of the Flow Characteristics of Micro Disc Valves," Micro–Electro–Mechanical Systems (MEMS), MEMS–Vol 2, ASME 2000.

R. Ramanathan, D. Metaxas, "Dynamic Deformable Models for Enhanced Haptic Rendering in Virtual Environments," Proceedings IEEE Virtual Reality, pp. 31–35, 2000.

B. Geeving, A. Kataria, C. Moore, I. Ebert–Uphoff, T. R. Kurfess, D. W. Rosen, "Conceptual Design of a Generalized Stereolithography Machine," Japan–USA Symposium on Flexible Automation, paper #2000JUSFA–13172, pp. 1159–1166, vol. 2, Ann Arbor, MI, Jul. 2000.

A. Kataria, D. W. Rosen, "Building Around Inserts: Methods for Fabricating Complex Devices in Stereolithography," Proceedings of DETC 2000, 2000 ASME Design Engineering Technical Conferences & Computers & Information in Engineering Conference, Baltimore, Maryland, Sept. 2000.

K. T. McDonnell, H. Qin, R. A. Wlodarczyk, "Virtual Clay: A Real–time Sculpting System with Haptic Toolkits," Proceedings Visualization 2000, Salt Lake City, Utah, Oct. 2000.

A. Gregory, A, Mascarenhas, S. Ehmann, M. Lin, D. Manocha, "Six Degree–of–Freedom Haptic Display of Polygonal Models," Proceeding Visualization 2000, Salt Lake City, Utah, Oct. 2000.

V. Hayward, J. M. Cruz–Hernandez, "Tactile Display Device Using Distributed Lateral Skin Stretch," Symposium on Haptic Interfaces for Virtual Environment & Teleoperator Systems, IMECE, Nov. 2000.

J. A. Diez, "Design for Additive Fabrication Building Miniature Robotic Mechanisms," M. S. Thesis, Georgia Institute of Technology, Mar. 2001.

John E. Stone, Justin Gullingsrud, Klaus Schulten, "A System for Interactive Molecular Dynamics Simulation," Proceedings 2001 ACM Symposium on Interactive 3D Graphics, Mar. 2001.

Mark Finch, Vernon L. Chi, Russell M. Taylor II, Mike Falvo, Sean Washburn, Richard Superfine, "Surface Modification Tools in a Virtual Environment Interface to a Scanning Probe Microscope," Proceedings 2001 ACM Symposium on Interactive 3D Graphics, Mar. 2001.

Ivan Amato, "Helping Doctors Feel Better," Technology Review, Apr. 2001.

L. A. Tse, P. J. Hesketh, D. W. Rosen, J. L. Gole, "Stereolithography on silicon for microfluidics and microsensor packaging," Microsystem Technologies 9 (2003), Aug. 2001.

R. S. Fearing, G. Moy, E. Tan, "Some Basic Issues in Teletaction," 1997 IEEE International Conference o Robotics and Automation, 1997.

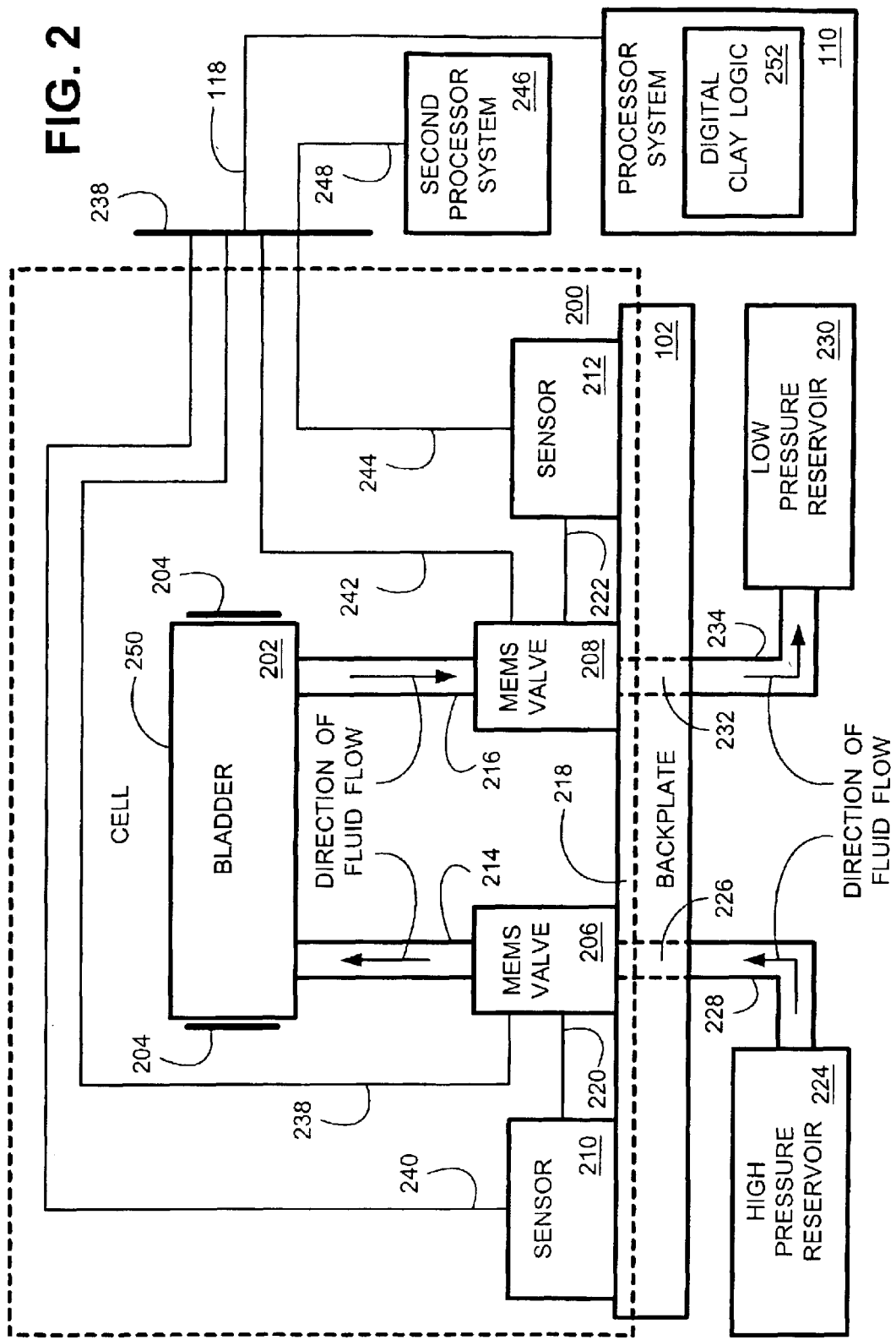

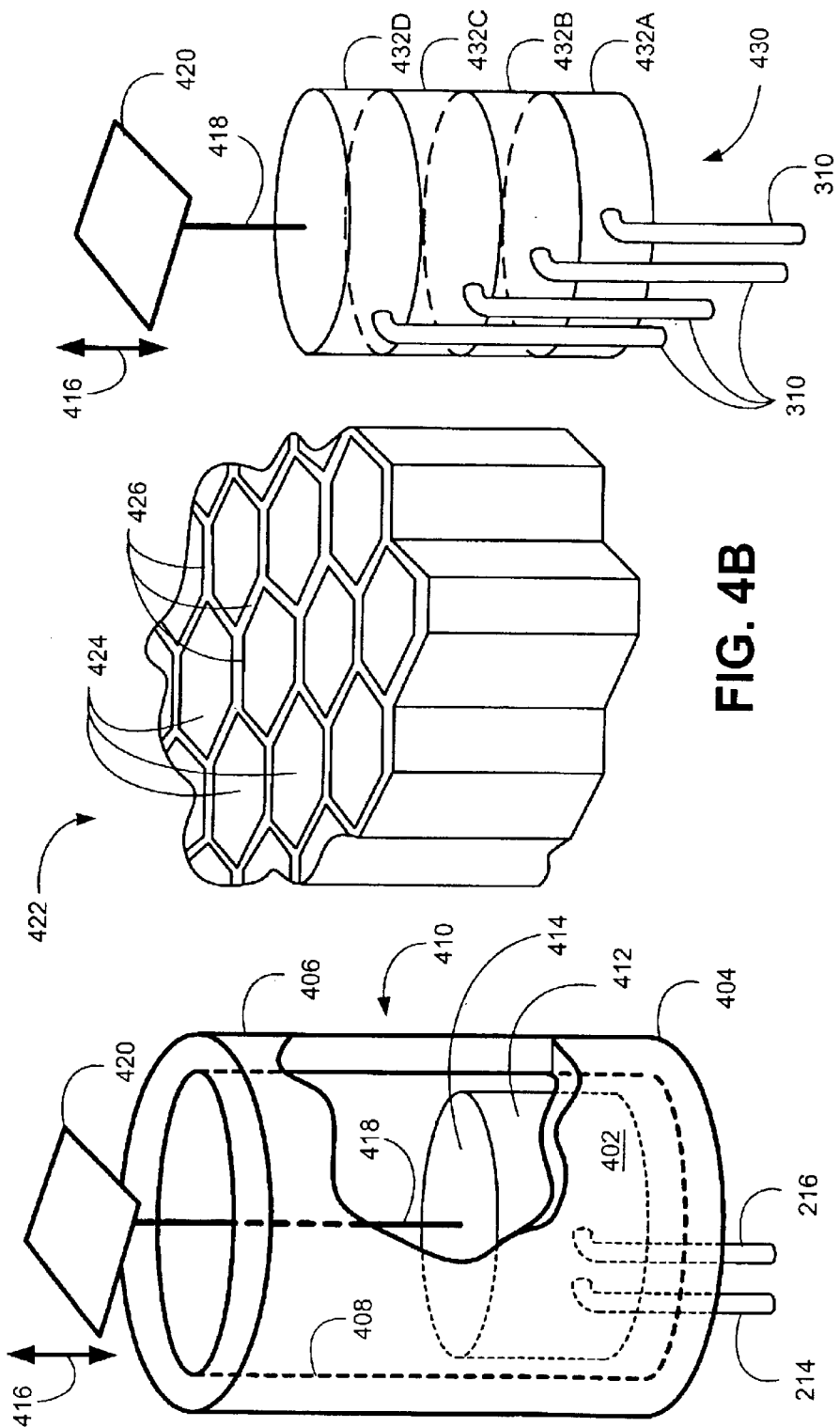

DIGITAL CLAY APPARATUS AND METHOD

RELATED APPLICATION

This document claims priority to and the benefit of the filing date of co-pending commonly assigned Provisional Application entitled, "DIGITAL CLAY FOR SHAPE INPUT TO AND DISPLAY FROM A COMPUTER," filed Jun. 8, 2001, and accorded Ser. No. 60/296,938. The foregoing pending provisional application is hereby incorporated herein by reference in its entirety.

TECHNICAL FIELD

The present invention is generally related to haptic interface devices and, more particularly, is related to a system and method for controlling the shape of and/or for receiving information pertaining to a surface and/or a volume of a digital clay device.

BACKGROUND OF THE INVENTION

Significant prior research has been performed in the area of haptic interfaces. Several haptic-based interaction systems have been developed and used for a variety of applications, including molecular dynamics simulation and steering, manipulation of nano-materials, surgical training, virtual prototyping, and digital sculpting.

Early haptic interface systems utilized a robot arm, both as a six degree-of-freedom input device as well as a force feedback output device, providing the user with a tactile perception of molecular forces and torques. Since then, alternative force-feedback devices with multiple degrees of freedom have been proposed. These approaches provide an intuitive interface for the manipulation of rigid bodies subjected to inertial, contact, or other forces. They are, however, significantly less convenient for sensing and altering the shape of curves and surfaces.

These haptic devices and techniques focus on force feedback, which assists the user in gauging the effort required to be exerted on the surface in order to achieve the desired shape alteration. This approach may also be used to provide information about the stiffness or density of the surface. In addition, such haptic approaches have been applied to the exploration of a field in a volume or even of fluid dynamics. However, these approaches do not provide sufficient tactile feedback regarding the shape of the surface.

Running the tip of a computer cursor over the virtual surface has been suggested as a means for "haptic surface rendering" and have been extended to real-time detection of contacts when manipulating an object with six degrees of freedom. The contact forces may be computed using the concept of "virtual proxy".

Such approaches, based on exploration of a surface with the tip or side of a stylus, produce forces that would result from contact, palpation, or stroking actions. These forces may reveal surface anomalies or attract the attention of the designer to small, high-spatial-frequency features that may have been more difficult to detect visually. However, stylus-based approaches are far from exploiting the natural ability of a designer to feel a surface by touching it with a wider area of the hand.

Interfaces involving touch have used gloves, manipulators controlling a stylus held by the hand, and arrays of actuators to depict a surface. They attempt to supply sensations received through our various touch and kinesthetic receptors, often broken into several regimes. Vector macro forces are at the gross end of that scale and are readily displayed by manipulator-like haptic devices. Vibrations are by nature a scalar field and may be distributed widely over the surface of the skin. The amplitude and frequency are noticeable but not the direction. The most difficult to display are small shapes, for which arrays of stimulators are necessary. To achieve both kinesthetic and tactile sensations simultaneously the combination of a haptic manipulator and a tactile array is currently required.

A stylus grasped by a user is one way to explore a haptic environment in a pointwise fashion. If the stylus is attached to a manipulator, interaction forces can be generated which represent interaction of the stylus with a virtual world. Available pointwise haptic displays allow forces and moments to be fed back to the user in two to six degrees of freedom and are well suited to provide the kinesthetic portion of a haptic experience. Haptic mice enable the user to feel the transition of the cursor between different regions of the screen. These haptic manipulators open new possibilities of interfacing, but are comparable to displaying a picture to a viewer one pixel at a time. Haptic manipulators must provide spatial relationships only through temporal sequencing, greatly compromising their efficiency. Sample rates of 1000 Hz are typical with forces controlled at 30 Hz or more for adequate display of features such as a breast tumor.

It is necessary to provide a totally synthetic view of the hand in the environment if haptics are coordinated with vision. Viewing the stylus and its device provides no supporting optical illusion. Another disadvantage of the numerous devices is that the ratio of the smallest to the largest displayable force is difficult to expand. When the hand should be moving unimpeded, it still must exert a force to move the device forward. This problem has been only partially overcome by utilizing a servomechanism based on the position of the hand to avoid contact (i.e., achieve 0 force) except when contact should be displayed.

SUMMARY OF THE INVENTION

The present invention provides a system and method for controlling the surface and/or volume of a digital clay device. Briefly described, in architecture, one embodiment is a method comprising the following steps: determining a desired position of a skeleton structure portion residing in the digital clay device, determining a volumetric change of a fluid residing in a bladder, the determined volumetric change corresponding to the determined desired position of the skeleton structure portion, opening a micro-electro mechanical systems (MEMS) valve so that the fluid flows through the MEMS valve thereby causing the determined volumetric change of the fluid residing in the bladder, and adjusting a position of the skeleton structure portion corresponding to the desired position of the skeleton structure portion, the position adjustment caused by a force generated by the bladder on the skeleton structure portion when the volume of the bladder changes in response to the determined volumetric change of the fluid residing in the bladder.

Another embodiment of the invention is a method comprising the following steps: determining an initial position of a skeleton structure portion residing in the digital clay device, sensing a pressure change in a bladder, the pressure change corresponding to an external force applied to an exterior portion of the digital clay device, opening a micro-electro mechanical systems (MEMS) valve in response to the sensed pressure change such that fluid residing in the bladder exits the bladder, sensing flow of the fluid through the MEMS valve, closing the MEMS valve when the sensed pressure is reduced to at least a predefined value, the reduced pressure resulting from the exit of fluid from the bladder, such that flow of the fluid through the MEMS valve stops, determining a volumetric change in the fluid from the sensed flow after the MEMS valve is closed, and determining a change in the position of the skeleton structure portion based upon the determined volumetric change.

Another embodiment of the invention comprises a processor system and a plurality of cells, each one of the plurality of cells further comprising at least one bladder, the bladder configured to hold a bladder fluid, at least one micro-electro mechanical systems (MEMS) valve, the valve controlled by the processor system, and at least one sensor coupled to the MEMS valve, the sensor configured to sense flow of a fluid through the MEMS valve such that a volumetric change in the bladder fluid is determinable by the processor system.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The components in the drawings are not necessarily to scale relative to each other. Like reference numerals designate corresponding parts throughout the several views.

FIG. 2 is a block diagram of an embodiment of a cell.

FIGS. 4A–G illustrate exemplary cell bladders and/or skeleton structure embodiments.

DETAILED DESCRIPTION

Figure 1A:
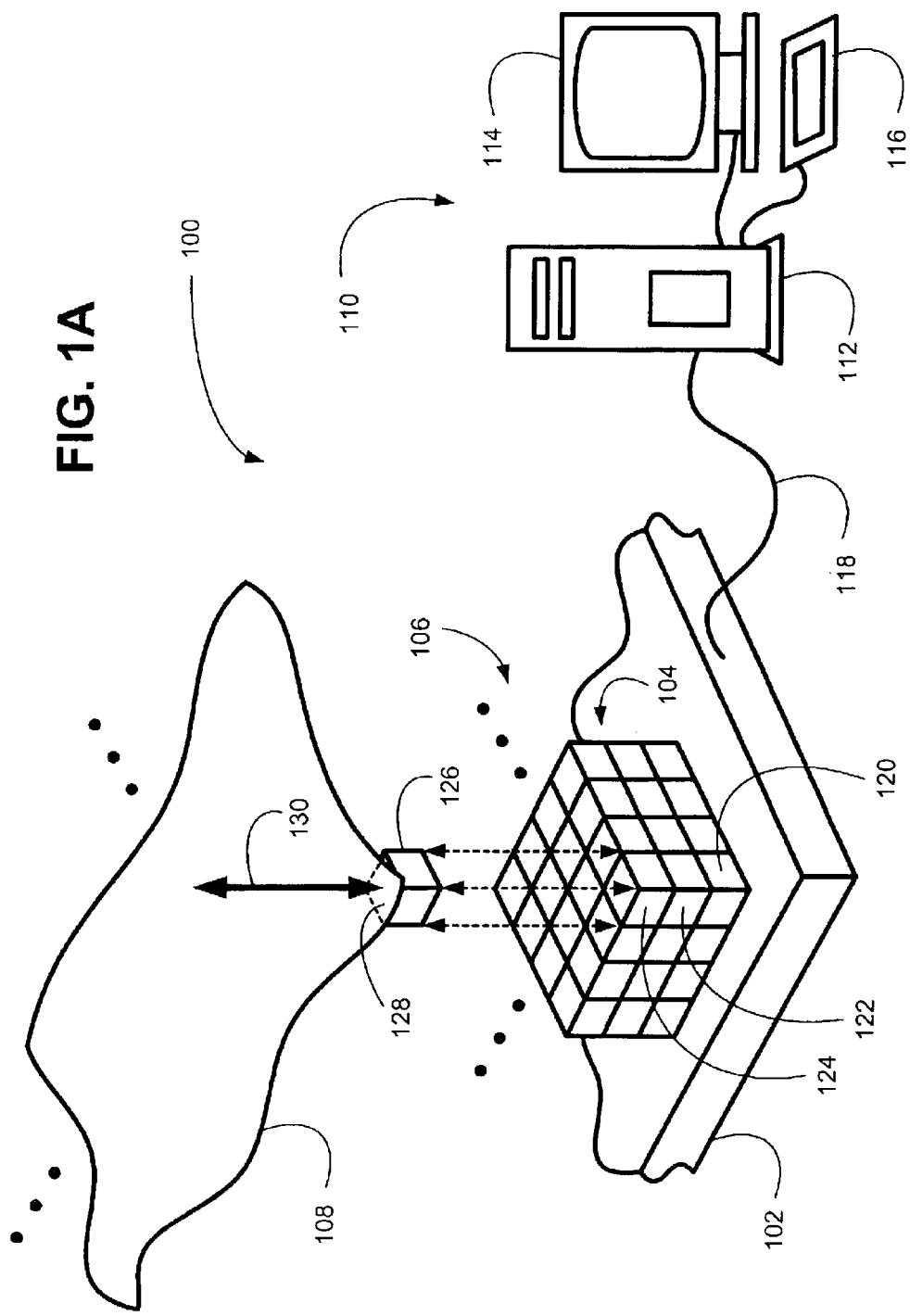
FIG. 1A is a block diagram of a table top embodiment of a digital clay device according to the present invention.

The present invention provides a system and method for controlling the shape of and/or for receiving information pertaining to a surface, or a volume, or both, of a digital clay device. When operating in one mode, the surface or volume is detected and determined by the present invention, a digital clay device, as described herein, such that a processing system embodiment digitally computes attributes relating to a state of the digital clay device surface and/or volume. When the present invention is operating in a shape and/or volume controlling mode, the processing system embodiment digitally computes desired attributes relating to the surface, or volume, or both, and instructs the digital clay device to deform to the desired attributes. Determination of attributes of the digital clay device surface and/or volume, and/or control of the digital clay device surface and/or volume, may be done statically or dynamically.

In engineering, art, science, medicine and/or communication, shape is a key feature for product design, sculpting, interpreting and/or understanding complex data and the relation between geometrical features. Also, many in our society depend on touch as a substitute for sight and are increasingly disenfranchised in visually dominated electronic communication in school and in everyday life. An effective means to specify (input) and display shapes to/from the computer is provided by the present invention, a digital clay device.

Natural clay is ideally a continuous medium. That is, it ideally has infinite resolution. Although digital clay is actually spatially discrete, with respect to human perception, the micro-sized nature of an individual cell of the digital clay device achieves a virtual infinite resolution with respect to human visual and tactile perception. Thus, digital clay, in one embodiment, has a texture and feel similar to natural clay.

One embodiment of a digital clay device is a distributed input/display device whose surface and/or volume can-be shaped by a human user and immediately acquired by a processing system. Or, the surface and/or volume can be shaped by the processing system for the human to examine. Like ordinary clay, digital clay allows a surface or volume to be touched, reshaped with pressure and seen by the user in true three-dimensional form. Unlike ordinary clay, digital clay also provides parameters to the processing system that will represent the shape for the surface and/or volume to the processing system for further analysis, storage, replication, communication and/or modification. Accordingly, digital clay allows the processing system to command its shape and/or volume, providing two-way communication between the processing system and the user.

The digital clay employs a fluid flow from a plurality of micro-electro mechanical systems (MEMS) valves to and from a large array of bladders. In one embodiment, the bladder array allows any variety of shapes (surface or volume) for a parallel-actuated structure covered with an elastomeric external skin. Stereolithography enables the efficient production of the actuated structure. Measurement by sensors coupled to the MEMS valves allows feedback control of the MEMS valves, thereby enabling the processing system to read or command the shape of the digital clay device.

When operating in a mode of controlling a shape and/or volume, the surface and/or volume of the digital clay is extended (or retracted) by the processing system controlled array of MEMS valves that allow pressurized fluid to flow into a massively parallel-actuated structure having bladders and a skeleton, thereby selectively extending (or retracting) selected portions of the surface and/or volume. The MEMS valves, in one embodiment, are located on a backplate and fluid is "piped" into the bladders, as described herein according to the present invention. MEMS valves move microscopically to allow fluid flow into/from a controlled bladder. Bladder fluid changes cause macroscopic displacements in the surface or volume of the digital clay device. With coordination of numerous MEMS valves, the characteristics of the digital clay surface or volume is controlled.

When operating in a mode of detecting and determining a shape and/or volume, a user applies an external force to the surface and/or volume of the digital clay device. Fluid is expelled from the bladders and through an array of MEMS valves. Shaping digital clay is fundamentally a removal and/or relocation process. Embedded sensors coupled to the MEMS valves allow actuator displacement and/or other parameters to be sensed directly, or computed from, sensed values. Accordingly, the sensors detect fluid changes in the bladders. Thus, when a force is applied to the digital clay surface, the MEMS valves are selectively allowed to open to avoid singular conditions internal to the digital clay.

A first digital clay embodiment is a "chunk of clay" that sits on a table top. Another embodiment is held by a user. Applications for the table top embodiment include, but are not limited to, terrain models, conceptual shape models of engineered products (e.g., cars), styling models for architecture and industrial design, and artistic sculpture. For the user held embodiment, applications include, but are not limited to, animation/claymation characters, conceptual design models of hand-held engineered devices, toys, and medical models of organs (shape and "feel" of one or more organs).

FIG. 1A is a block diagram of a table top embodiment of a digital clay device 100 according to the present invention. The digital clay device includes a backplate 102, a plurality of cells 104 configured into a predetermined three-dimensional cell array 106, a digital clay surface 108, and a processing system 110. For convenience, only a portion of the backplate 102, digital clay array 106 and digital clay surface 108 is illustrated in FIG. 1A. The shape, size, elasticity and texture of the digital clay surface 108 can be selected to suit a particular embodiment.

Processing system 110 is illustrated for convenience as having at least a processor unit 112, a monitor 114 and a keyboard 116. Processing system 110 controls the execution of a program, described herein, employed by the present invention. It is understood that any suitable processor system 110 may be employed in various embodiments of a digital clay device. Processing system 110 may be a specially designed and/or fabricated processing system, or a commercially available processing system. Non-limiting examples of commercially available processor systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

Processing system 110 is coupled to a plurality of MEMS valves and sensors of each cell 104, as described in greater detail below, via connection 118. Connection 118, for convenience, is illustrated as a single connection. However, it is understood that connection 118 includes internally a plurality of connections, thereby providing connectivity between processor system 110 and other discrete devices such as the MEMS valves, sensors, or a suitable interface bus residing in the backplate 102.

In the embodiment illustrated in FIG. 1A, movement of the digital clay surface 108 is along one axis of movement, namely up or down, based upon the orientation of the digital clay surface 108 as illustrated in FIG. 1A. It is understood that the digital clay surface 108 may be oriented in any desirable manner.

The cell array 106 includes a plurality of columns of cells 120, 122, 124 through 126. Cells 120, 122, 124 through 126 each include a bladder configured to hold a fluid and a skeleton configured to direct forces associated with changes in volume of the bladder, as described in greater detail below. The bottom of cell 120 is supported by a portion of the backplate 102. Cells 122, 124 through 126 are stacked on top of cell 120. Cell 126, the top cell of a column of cells (comprised of a plurality of cells) is in contact with a skeleton structure portion 128, described in greater detail below. The skeleton structure portion 128 is in contact with the digital clay surface 108.

When fluid is added to one or more of the plurality cells 120, 122, 124 through 126, the skeleton structure portion 128 of the digital clay surface 108 is moved upwards in the direction illustrated by arrow 130. When fluid is removed from one or more of the cells 120, 122, 124 through 126, the skeleton structure portion 128 in contact with the digital clay surface 108 is moved downwards in the direction illustrated by arrow 130. Accordingly, it is understood that the position of the skeleton structure portion 128 is controlled by adding or removing fluid in the cells 120, 122, 124 through 126. Furthermore, it is understood that the position of the skeleton structure portion 128 is determined by determining the amount of fluid in the cells 120, 122, 124 through 126. Adding, removing and determining the amount of fluid in the cells 120, 122, 124 through 126 according to the present invention is described in greater detail below.

It is understood that the cell array 106 is comprised of a plurality of columns of cells. The top cell of each column of cells is in contact with a portion of the digital clay surface 108. Thus, the position of any individual portion of the digital clay surface 108 is determinable and/or controllable since the amount of fluid in each one of the cells in a cell column is determinable and/or controllable. Accordingly, it is further understood that the shape, position and contours of the entire digital clay surface 108 is determinable and/or controllable since the individual portions of the digital clay surface 108 are determinable and/or controllable by its respective cell column.

Figure 1B:
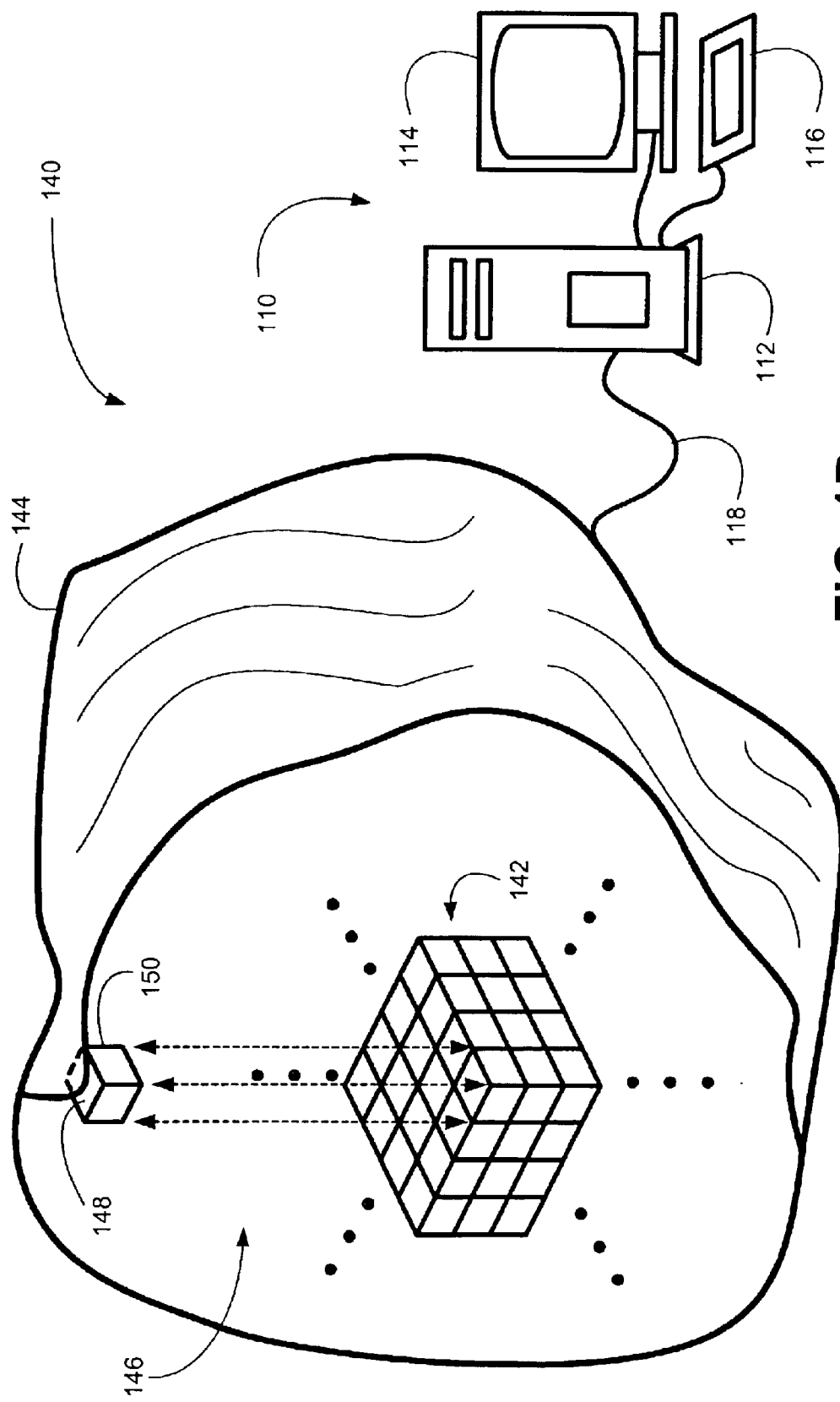
FIG. 1B is a block diagram of a hand held embodiment of a digital clay device according to the present invention.

FIG. 1B is a block diagram of a hand held embodiment of a digital clay device 140 according to the present invention. Processor system 110 controls the digital clay device 140 as described herein. Digital clay device 140 includes a matrix of cells 142, each cell having bladders and a skeleton structure as described herein. The matrix of cells 142 extends out to the digital clay surface 144. The shape, size, elasticity and texture of the digital clay surface 144 can be selected to suit a particular embodiment. For convenience, a portion of the digital clay surface 144 is illustrated as being cut away to show an interior region 146 of the digital clay device 140.

For each portion of the digital clay surface 144, a cell portion 148 of a cell 150 is in contact with the portion of the digital clay surface 144. Thus, position of the portion of the digital clay surface 144 is determinable and/or controllable according to the present invention.

FIG. 2 is a block diagram of an embodiment of a cell 200. Cell 200 includes a bladder 202, a skeleton structure portion 204, MEMS valves 206 and 208, sensors 210 and 212, pipes 214 and 216, and a portion 218 of backplate 102. MEMS valves 206 and 208, and sensors 210 and 212, are fabricated/mounted on or into the portion 218 of backplate 102. Sensor 210, coupled to MEMS valve 206 via connection 220, is configured to sense information corresponding to the amount of fluid passing through MEMS valve 206. Similarly, sensor 212, coupled to MEMS valve 208 via connection 222, is configured to sense information corresponding to the amount of fluid passing through MEMS valve 208.

MEMS valve 206 is coupled to high pressure reservoir 224 via a channel 226 and a pipe 228. Channel 226 is fabricated into backplate 102 and is coupled to MEMS valve 206. Channel 226, pipe 228, MEMS valve 206 and pipe 214 communicate fluid from the high pressure reservoir 224 to the bladder 202 when MEMS valve 206 is open. Accordingly, it is understood that pressure of bladder 202 is less than the pressure of the high pressure reservoir 224. In an alternative embodiment, high pressure reservoir 224 is directly coupled to channel 226 such that pipe 228 is omitted.

Similarly, MEMS valve 208 is coupled to low pressure reservoir 230 via a channel 232 and a pipe 234. Channel 232 is fabricated into backplate 102 and is coupled to MEMS valve 208. Channel 232, pipe 234, MEMS valve 208 and pipe 216 communicate fluid from the bladder 202 to the low pressure reservoir 230 when MEMS valve 208 is open. Accordingly, it is understood that pressure of bladder 202 is greater than the pressure of the low pressure reservoir 230. In an alternative embodiment, low pressure reservoir 230 is directly coupled to channel 232 such that pipe 234 is omitted.

For convenience, an optional bus 238 is illustrated as providing connectivity between connection 118 and connections 238, 240, 242 and 244. In one embodiment, a second processor system 246 is coupled to bus 238, via connection 248, to facilitate management of communication of control signals and/or information between processor system 110 and MEMS valves 206 and 208, and sensors 210 and 212. The bus 238 and/or the second processing unit 246 may be fabricated into the backplate 102 or reside as an external component, depending upon the embodiment. In another embodiment, the second processor 246 is omitted such that MEMS valves 206 and 208, and sensors 210 and 212, are in direct communication with the processor system 110. Similarly, in another embodiment, bus 238 is omitted such that MEMS valves 206 and 208, and sensors 210 and 212, are in direct communication with the processor system 110 (and/or the second processor system 246 if included).

Accordingly, when the bladder 202 is to be expanded (increase volume), a suitable control signal is communicated by processor system 110 to MEMS valve 206, thereby causing MEMS valve 206 to open. Sensor 210 senses the volume of fluid passing through MEMS valve 206 and communicates the information to processor system 110. When a desired amount of fluid is transported into bladder 202, a suitable control signal is communicated by processor system 110 to MEMS valve 206, thereby causing MEMS valve 208 to close. As described above, expansion of bladder 202 when fluid is added causes an associated force to be exerted such that the moveable portions 250 of the bladder 202 causes a portion of the digital clay surface to move in a controlled direction.

Similarly, when the bladder 202 is retracted (decrease volume), a suitable control signal is communicated by processor system 110 to MEMS valve 208, thereby causing MEMS valve 208 to open. Sensor 212 senses the volume of fluid passing through MEMS valve 208 and communicates the information to processor system 110. When a desired amount of fluid is transported from bladder 202, a suitable control signal is communicated by processor system 110 to MEMS valve 208, thereby causing MEMS valve 208 to close. As described above, retraction of bladder 202 when fluid is removed causes an associated force to be exerted such that moveable portion 250 of the bladder 202 causes a portion of the digital clay surface to move in a controlled direction.

Furthermore, an external force may be exerted on the moveable portion 250 of bladder 202, via a skeleton structure portion 204, thereby increasing pressure in bladder 202. For example, a user may squeeze the digital clay surface, thereby causing an external pressure on the moveable portion 250 of bladder 202. Sensor 210, sensor 212 or another suitable sensor (not shown) detects the change in pressure of bladder 202. The information from the sensor is communicated to processor system 110 such that the processor system understands that an external force is being exerted on the digital clay surface, and that it is desirable to remove (or add) fluid from the bladder 202 such that the digital clay deforms in accordance with the applied external force. Accordingly, processor system 110 communicates a suitable signal to MEMS valve 208 such that the MEMS valve 208 opens, thereby allowing fluid to exit from the bladder 202. Or, processor system 110 communicates a suitable signal to MEMS valve 206 such that the MEMS valve 206 opens, thereby allowing fluid to enter into the bladder 202. When the sensor 210, sensor 212 or other suitable sensor detects a return of bladder pressure to a predetermined value and/or pressure change, and such corresponding information is communicated to processor system 110, a suitable control signal is communicated such that the opened MEMS valve 208 or 206 is closed.

Figure 3:
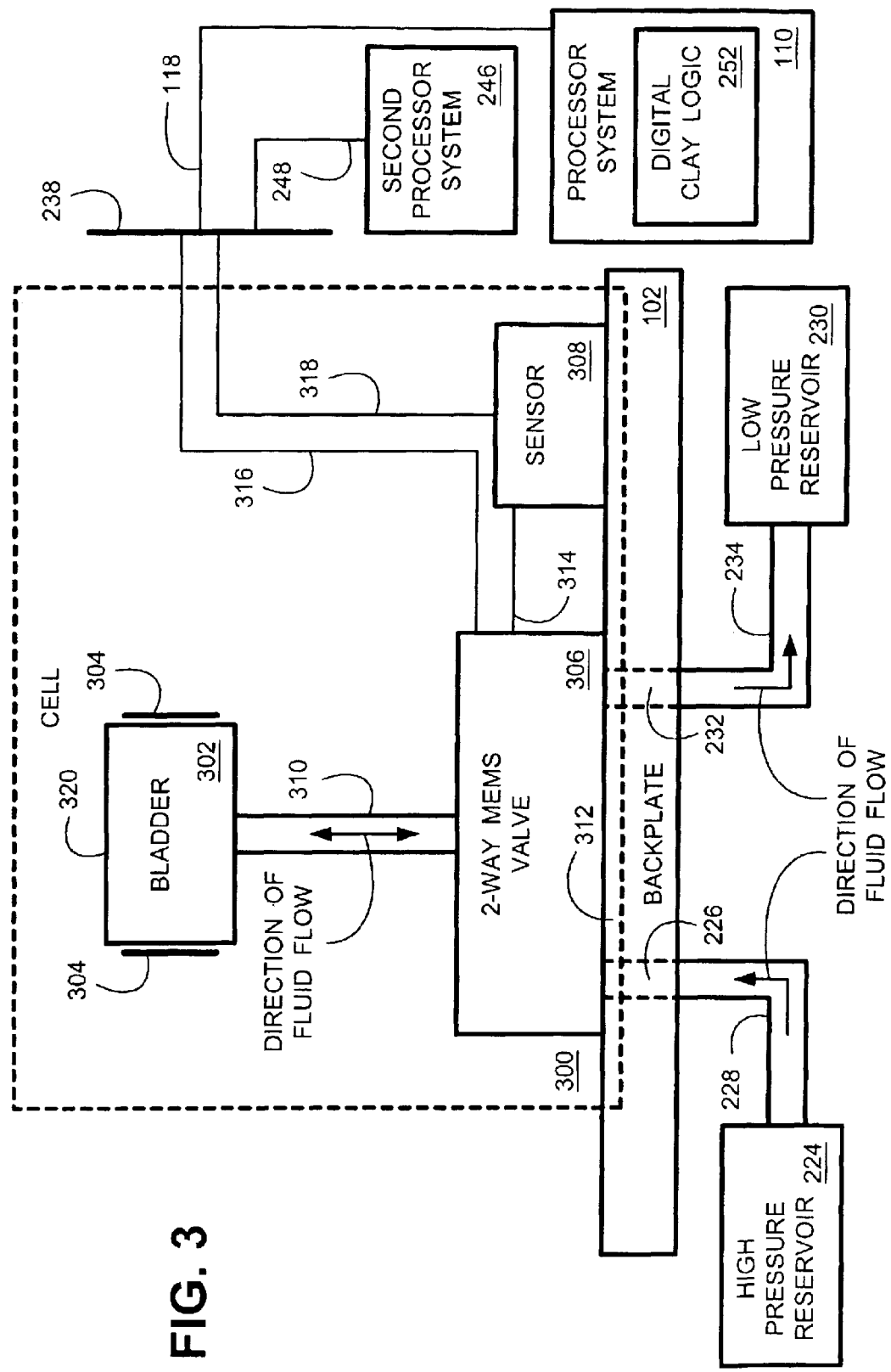
FIG. 3 is a block diagram of an alternative embodiment of a cell.

FIG. 3 is a block diagram of an alternative embodiment of a cell 300. Cell 300 includes a bladder 302, a skeleton 304, a two-way MEMS valve 306, a sensor 308, a pipe 310, and a portion 312 of backplate 102. MEMS valve 306 and sensor 308 are fabricated/mounted on or into the portion 312 of backplate 102. Sensor 308, coupled to MEMS valve 306 via connection 314, is configured to sense information corresponding to the amount of fluid passing through MEMS valve 306.

MEMS valve 306 is coupled to high pressure reservoir 224 via a channel 226 and a pipe 228. Channel 226 is fabricated into backplate 102 and is coupled to MEMS valve 306. Channel 226, pipe 228, MEMS valve 306 and pipe 310 communicate fluid from the high pressure reservoir 224 into the bladder 302 when MEMS valve 306 is open in a first position. Accordingly, it is understood that pressure of bladder 302 is less than the pressure of the high pressure reservoir 224. In an alternative embodiment, high pressure reservoir 224 is directly coupled to channel 226 such that pipe 228 is omitted.

Similarly, MEMS valve 306 is coupled to low pressure reservoir 230 via a channel 232 and a pipe 234. Channel 232 is fabricated into backplate 102 and is coupled to MEMS valve 306. Channel 232, pipe 234, MEMS valve 306 and pipe 310 communicate fluid from the bladder 302 to the low pressure reservoir 230 when MEMS valve 306 is open in a second position. Accordingly, it is understood that pressure of bladder 302 is greater than the pressure of the low pressure reservoir 230. In an alternative embodiment, low pressure reservoir 230 is directly coupled to channel 232 such that pipe 234 is omitted.

For convenience, an optional bus 238 is illustrated as providing connectivity between connection 118 and connections 316 and 318. In another embodiment, a second processor system 246 is coupled to bus 238, via connection 248, to facilitate management of communication of control signals and/or information between processor system 110 and MEMS valve 306 and sensor 308. The bus 238 and/or the second processing unit 246 may be fabricated into the backplate 102 or reside as an external component, depending upon the embodiment. In another embodiment, the second processor 246 is omitted such that MEMS valve 306 and sensor 308 are in direct communication with the processor system 110. Similarly, in another embodiment, bus 238 is omitted such that MEMS valve 306 and sensor 308 are in direct communication with the processor system 110 (and/or the second processor system 246 if included).

Accordingly, when the bladder 302 is expanded (increase volume), a suitable control signal is communicated by processor system 110 to MEMS valve 306, thereby causing MEMS valve 306 to open in the first position. Sensor 308 senses the volume of fluid passing through MEMS valve 306 and communicates the information to processor system 110. When a desired amount of fluid is transported into bladder 302, a suitable control signal is communicated by processor system 110 to MEMS valve 306, thereby causing MEMS valve 306 to close. As described above, expansion of bladder 302 when fluid is added causes an associated force to be exerted such that the moveable portions 320 of the bladder 302 causes a portion of the digital clay surface to move in a controlled direction.

Similarly, when the bladder 302 is retracted (decrease volume), a suitable control signal is communicated by processor system 110 to MEMS valve 306, thereby causing MEMS valve 306 to open in a second position. Sensor 308 senses the volume of fluid passing through MEMS valve 306 and communicates the information to processor system 110. When a desired amount of fluid is transported from bladder 302, a suitable control signal is communicated by processor system 110 to MEMS valve 306, thereby causing MEMS valve 306 to close. As described above, retraction of bladder 302 when fluid is removed causes an associated force to be exerted such that moveable portion 320 of the bladder 302 causes a portion of the digital clay surface to move in a controlled direction.

Furthermore, an external force may be exerted on the moveable portion 320 of bladder 302, thereby increasing pressure in bladder 302. For example, a user may squeeze the digital clay surface, thereby causing an external pressure on the moveable portion 320 of bladder 302. Sensor 308 or another suitable sensor (not shown) detects the change in pressure of bladder 302. The information from the sensor 308 is communicated to processor system 110 such that the processor system understands that an external force is being exerted on the digital clay surface, and that it is desirable to remove (or add) fluid from the bladder 302 such that the digital clay deforms in accordance with the applied external force. Fluid would be added to bladder 302 when bladder pressure decreases, and removed from bladder 302 when bladder pressure increases. Accordingly, processor system 110 communicates a suitable signal to MEMS valve 306 such that the MEMS valve 306 opens, thereby allowing fluid to exit from the bladder 302. Or, processor system 110 communicates a suitable signal to MEMS valve 306 such that the MEMS valve 306 opens, thereby allowing fluid to enter into the bladder 302. When the sensor 308 or other suitable sensor detects a return of bladder pressure to a predetermined value and/or pressure change, and such corresponding information is communicated to processor system 110, a suitable control signal is communicated such that the opened MEMS valve 306 is closed.

In alternative embodiments, the second processor system 246 (FIGS. 2 and 3) is configured to receive general instructions relating to the control of individual bladders and/or bladder units from processor system 110. The second processor system 246 then determines and communicates suitable control signals to individual MEMS valves to add or remove fluids from individual bladders.

Furthermore, in another embodiment, the second processor system 246 is configured to receive information from individual sensors and to determine changes in fluid volumes in the corresponding individual bladders. Corresponding changes in position of the skeleton structure portions, as described in greater detail below, is determined and communicated to the processor system 110.

For convenience, sensors 210, 212 and 308 (FIGS. 2 and 3) are illustrated and described above as a generalized, non-specific type of sensor. Any suitable sensor may be used that provides information such that the changes in bladder fluid volume are determinable. In one embodiment, a sensor is configured to directly measure the fluid volume flow through a MEMS valve. In another embodiment, a sensor is configured to directly measure fluid flow rate through a MEMS valve. With this sensor, the change in fluid volume is determined by the integral of the sensed fluid flow rates during the time that the MEMS valve is open. In yet another embodiment, a sensor is configured to directly measure pressure differences across a MEMS valve. With this sensor, the change in fluid volume is determined by the integral of the sensed pressure difference to compute a flow rate during the time that the MEMS valve is open. Other embodiments employ other suitable sensors.

Skeleton structure portions 204 (FIG. 2) and 304 (FIG. 3) are comprised of at least one rigid skeleton portion. The rigid portion of the skeleton structure portions 204 and 304 restrain movement of the bladders 202 (FIG. 2) and 302 (FIG. 3) when the portions of the bladders 202 and 302 are in contact with the rigid portions of the skeleton structure portions 204 and 304. Thus, the bladders 202 and 302 move within the skeleton in the unrestrained direction(s) as fluid is removed from or added to the bladders 202 and 302. That is, skeleton structure portions 204 and/or 304 constrain movement of the bladders 202 and 302 to a desired direction(s) when the volume of the bladders 202 and 302 is changed.

In the digital clay device, the skeleton structure portions are selectively coupled together. Coupling may be either rigidly or flexibly. That is, flexible joints or hinges may be used to couple the skeleton structure portions. Accordingly, it is understood that a skeleton having a plurality of skeleton structure portions is used to provide a skeleton that moves in a predictable manner. And, the position of the individual skeleton portions define the shape of the skeleton. Movement of the skeleton is definable by changes in the position of skeleton members.

Various control signals and information signals communicated from and/or to processor system 110 are processed by the digital clay logic 252 residing in the processor system 110. If a second processor system 246 is employed to coordinate communication of signals, and/or generate control signals, as described herein, a portion of the digital clay logic 252 may reside in the second processor system 246.

Another embodiment of a MEMS valve is configured to open when a pressure differential across the MEMS valve exceeds a predetermined pressure difference. The MEMS valve, in one embodiment, is controlled mechanically by the pressure difference. In another embodiment, the MEMS valve is controlled electronically based upon sensed pressure differences. Accordingly, if an external force applied to a bladder increases bladder pressure, and the resultant pressure difference exceeds the predefined pressure difference, the MEMS valve opens to allow fluid to flow from the bladder to the low pressure reservoir 230. Similarly, if an external force applied to a bladder decreases bladder pressure, and the resultant pressure difference exceeds the predefined pressure difference, the MEMS valve opens to allow fluid to flow from the high pressure reservoir 224 into the bladder.

Furthermore, rate of change information in the bladder pressures, generated by external forces, may be determined. This determined rate of pressure change allows determination of the rate of change of the skeleton portions, and accordingly, allows determination of the rate of change of the digital clay device surface.

FIG. 4A illustrates an exemplary cell bladder 402 and skeleton structure portion 404 embodiment. For convenience, bladder 402 is illustrated as a cylindrical shape. Two pipes 214 and 216 (see also FIG. 2) are illustrated. As described above, pipes 214 and 216 provide for the transfer of fluid into and out of the cell 402, as described above for cell 200 (FIG. 2). For convenience, skeleton structure portion 404 is illustrated as being shaped as a tube. Skeleton structure portion 404 includes an outer wall 406 and an inner wall 408. The diameter of the inner wall 408 is approximately the same diameter of the bladder 402. For illustrative purposes, a portion of the skeleton structure portion 404 is illustrated as having a cut-away section 410. (Accordingly, non visible portions of the bladder 402 and the skeleton structure portion 404 are denoted with dashed lines.)

Thus, as fluid is added to bladder 402, the portion 412 of bladder 402 in contact with the inner wall 408 is kinematically constrained from moving in an outward direction (normal to the inner wall 408). Thus, as the bladder expands, the top surface 414 of bladder 402 moves in an upward direction (assuming that the bottom of bladder 402 is constrained), as indicated by the arrow 416. Similarly, as the bladder deflates, the top surface 414 of bladder 402 moves in a downward direction (assuming that the bottom of bladder 402 is constrained), as indicated by the arrow 416.

Top surface 414 is illustrated as being in contact with a member 418. Member 418 is illustrated as being in contact with a skeleton structure portion 420. Thus, movement of the top surface 414 in the upward direction (when fluid is added into bladder 402) causes the skeleton structure portion 420 to move upward by a corresponding amount. Similarly, movement of the top surface 414 in the downward direction (when fluid is removed from bladder 402) causes the skeleton structure portion 420 to move downward by a corresponding amount.

The simplified bladder 402 and skeleton structure portion 404, and their associated components, as described above and illustrated in FIG. 4A, demonstrate selected aspects of the present invention. That is, movement of a bladder within a separate skeleton can control movement of a remote surface. Furthermore, for simplicity, a member 418 was used to illustrate one possible way to couple the skeleton structure portion 420 to the bladder 402. Alternative embodiments may use multiple members coupled to a plurality of digital clay surface portions. Or, the top surface 414 may be in direct contact with the skeleton structure portion 420 (assuming that the skeleton structure portion 404 is configured appropriately). Also, the member 418 is illustrated as representing a dowel, rod, bar of the like. It is understood that the member may be constructed of any suitable material and may have any suitable configuration without departing substantially from the present invention. Thus, the member 418 may be a composite material, a rigid material, or even a semi-rigid material. In one embodiment, member 418 and skeleton structure portion 420 are fabricated as a single unit, or fabricated together as a portion of a complex skeleton structure.

Another aspect of the simplified bladder 402 and skeleton structure portion 404 is that for convenience, the simplified bladder 402 and skeleton structure portion 404 were illustrated as having a cylindrical shape. It is understood that the simplified bladder 402 and skeleton structure portion 404 may have any suitable shape. For example, the simplified bladder 402 and skeleton structure portion 404 may have a plurality of flat sides, such as a triangle, square, hexagon or other suitable multiple sided shape to facilitate the fabrication of a cell matrix having a plurality of adjacent cells (bladders 402, skeleton structure portions 404 and associated components). Furthermore, portions of the simplified bladder 402 and/or skeleton structure portion 404 may be curvilinear.

Also, it is understood that a unitary body skeleton 422 configured to kinematically restrain movement of a plurality of bladders may be constructed. FIG. 4B illustrates one such embodiment, wherein the skeleton 422 is configured to restrain many bladders (not shown) residing in cavities 424. Thus, individual walls 426 of the skeleton 422 restrain multiple bladders.

With the simplified bladder 402 and skeleton structure portion 404, and their associated components, as described above and illustrated in FIG. 4A, range of movement of the skeleton structure portion 420 afforded by the movement of the top surface 414 is ultimately limited by the maximum volume of fluid that can be added to or removed from bladder 402. When bladder 402 and skeleton structure portion 404 are fabricated using micro technologies described herein, the range of movement provided by a single bladder 402 is not perceptible by a user of the digital clay device.

FIG. 4C illustrates an embodiment of a bladder unit 430 employing a plurality of stacked bladders 432A–D. It is understood that the stacked bladders 432A–D are illustrated for convenience as being shaped in a cylindrical form, similar to bladder 402 (FIG. 4A). Accordingly, bladders 432A–D are configured to fit together within the skeleton structure portion 404 (FIG. 4A) to form bladder unit 430. Thus, the total range of movement that may be imparted onto the skeleton structure portion 420 equals the sum of the individual range of motion for each one of the bladders 432A–D. It is understood that any desirable number of bladders may be used in a bladder unit. Furthermore, it is understood that bladders 432A–D may be shaped to fit within any type of skeleton. For example, but not limited to, the bladders 432A–D could be shaped so as to reside in one of the cavities 424 of skeleton 422 (FIG. 4B).

Also, the bladders 432A–D are illustrated as employing a single pipe 310 configured to transfer fluid into or out of its respective bladder, as described above in the embodiment illustrated in FIG. 3. Thus, it is understood that for any of the bladder embodiments, skeleton embodiments and/or combined bladder-skeleton embodiments described herein, that fluids may be transferred into or removed from using the embodiments described in FIGS. 2 and/or 3.

Skeleton structure portions 204 (FIG. 2) and 304 (FIG. 3), and bladders 202 and 302, respectively, are illustrated for convenience as being separate components. FIG. 4D is a perspective view of an embodiment wherein the bladder and the skeleton are formed as a single bladder-skeleton unit 440. Bladder-skeleton unit 440 is illustrated for convenience as employing a single pipe 310 configured to transfer fluid into or out of its respective bladder, as described above in the embodiment illustrated in FIG. 3. Another bladder-skeleton unit 440 embodiment transfers fluids into or from using the bladder-skeleton unit 440 as described in FIG. 2.

Bladder-skeleton unit 440 has eight sides; a top side 442, a bottom side 444 (hidden from view), an upper right-hand side 446, a lower right-hand side 448 (hidden from view), an upper left-hand side 450, a lower right-hand side 452 (hidden from view), a front side 454 and a back side 456

(hidden from view). The front side 454 and the back side 456 are flexible, but are restrained to moving (stretching) in directions normal to the other sides 442, 444, 446, 448, 450 and 452. (That is, the front side 454 and the back side 456 do not bulge substantially inward or outward when fluid is added to or removed from the bladder-skeleton unit 440.)

In this embodiment, sides 442, 444, 446, 448, 450 and 452 are rigid, or relatively rigid. Adjacent sides are coupled together as shown with a hinging device 460. Thus, a hinge 458 couples the upper right-hand side 446 to the lower right-hand side 448. Similarly, a hinge 460 couples the upper left-hand side 450 and the lower left-hand side 452, a hinge 462 couples the top side 442 with the upper right-hand side 446, and a hinge 464 couples the top side 442 with the upper left-hand side 450. It is understood that two similar hinges couple the bottom side 444 to the lower right-hand side 448 and to the lower right-hand side 452. Accordingly, as fluid is added to or removed from the bladder-skeleton unit 440, the top side 442 and/or the bottom side 444 move in an upwards or downwards direction, as indicated by the direction arrow 468. Depending upon the particular digital clay device 100 in which the bladder-skeleton unit 440 is used, the top side 442 or the bottom side 444 may be fixed to a rigid structure, thereby limiting movement to the opposing side.

For example, as fluid is added into the bladder-skeleton unit 440, the top side 442 is forced to move in an upwards direction (particularly if the bottom side is in a fixed position). Thus, the angle 470 (formed by the joining of the upper right-hand side 446 to the lower right-hand side 448) and the angle 472 (formed by the joining of the upper left-hand side 450 to the lower left-hand side 452) increase. Concurrently, the angles 474 (formed by the joining of the other sides as shown) decrease.

Similarly, as fluid is removed from the bladder-skeleton unit 440, the top side 442 is forced to move in a downwards direction (particularly if the bottom side is in a fixed position). Thus, the angle 470 and the angle 472 decrease. Concurrently, the angles 474 increase.

During fabrication, as described in greater detail below, a plurality of bladder-skeleton units 440 may be fabricated together. In such an embodiment, resulting in a honey comb-like skeleton matrix, a large cell matrix is formed. Thus, such an embodiment employing a plurality of bladder-skeleton units 440 can be fabricated to form any desired shape, form or size. Also, bladder-skeleton units may be formed having any suitable number of sides and/or curvilinear surfaces.

Figure 4E:
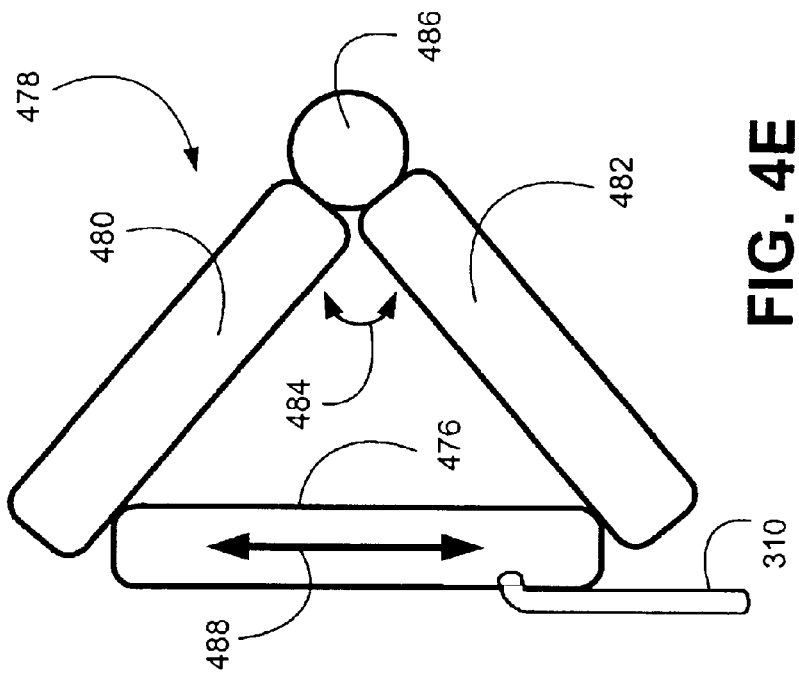
Figure 4D:
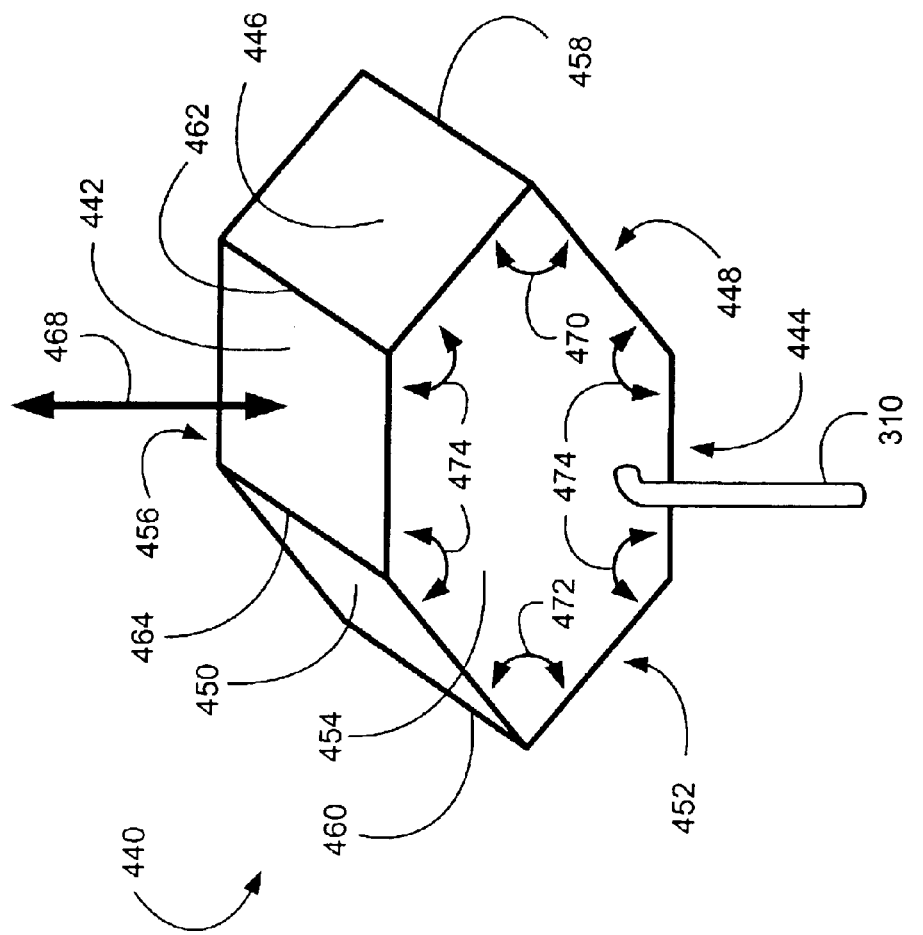

FIG. 4E illustrates an embodiment employing a bladder unit 476 and a skeleton unit 478. Bladder unit has at least one bladder (as indicated by the pipe 310). A bladder unit 476 may have a plurality of bladders and be constructed in accordance with any of the embodiments described herein.

Skeleton unit 478 has a first member 480 and a second member 482, forming an angle 484 therebetweeen. A hinge 486 allows the two members 480 and 482 to move, thereby changing the angle 484. It is understood that the bladder unit 476 controls the position of the members 480 and 482. Thus, when the bladder unit 480 is extended when fluid is added into the bladder, as shown by the direction arrow 488, angle 484 increases. Similarly, when fluid is removed from the bladder unit 476 such that the bladder retracts, angle 484 decreases.

Skeleton unit 478 is a simplified, non-limiting example of a component that provides for angular control of two members 480 and 482. Members 480 and 482 may have any suitable form, such as, but not limited to, bars, rods, plates, curvilinear surfaces, or even object surfaces. Furthermore, it is understood that the skeleton unit 478 may be a portion of a larger integrated skeleton structure used in a digital clay device.

Figure 4F:
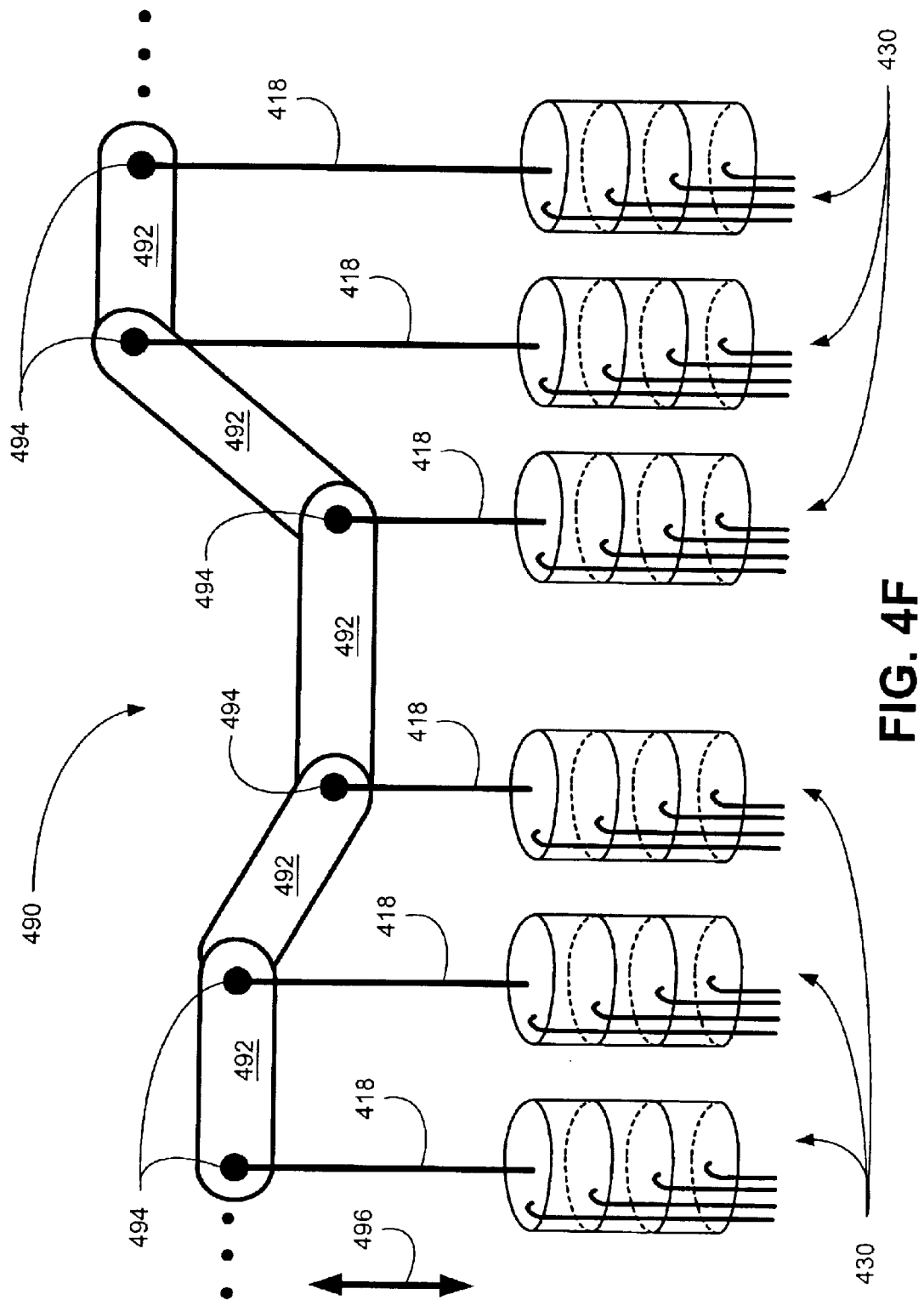

FIG. 4F illustrates an embodiment employing a plurality of bladder units 430 (see also FIG. 4C) to control a linear skeleton structure 490. Linear skeleton structure 490 is comprised of a plurality of members 492. Each member 492 is coupled together as shown at point 494. Point 494 is a flexible connector, such as a pin or flexible portion of a continuous structure, as described in greater detail herein.

As described above, optional members 418 couple the top of the bladder unit 430 to a point 494. As fluid is added to the bladders of bladder unit 430, an upward force is exerted onto its respective point 494 such that the position of the respective coupled members 492 is moved upward, as indicated by the direction arrow 496. Similarly, as fluid is removed from the bladders of bladder unit 430, a downward force is exerted onto its respective point 494 such that the position of the respective coupled members 492 is moved downward, as indicated by the direction arrow 496. Also, if an external downward force is applied to any member 492, the linear skeleton structure 490 and positions of the individual members 492 are moved such that a corresponding force is generated on the respective bladder unit 430. The force on the bladder unit 430 causes fluid to be expelled, as described above, such that the new positions of the members 492 are determinable.

Therefore, it is understood that the shape of the linear skeleton structure 490, and the position of any individual member 492, is controllable by the bladder units 430 according to the present invention. Furthermore, deformations in the shape of the linear skeleton structure 490, or changes in the position of any individual member 492, caused by an external force is determinable by the present invention.

When a plurality of linear skeleton structures 490 are aligned side-by-side to from an array, a surface is defined. The surface may be part of a table top embodiment similar to the embodiment illustrated in FIG. 1A, or may be part of the surface of a volume of digital clay. Furthermore, the top of the plurality of linear skeleton structures 490 may be covered with a flexible digital clay surface 108 (FIG. 1A).

Additionally, as described above, it is understood that each one of the bladder units 430 is associated with its own skeleton (not shown) such that when fluid is added or removed from individual bladders, forces and movement are generated along the direction shown by the direction arrow 496. Furthermore, the skeletons associated with each of the bladder units 430 and the linear skeleton structure 490 may be formed into a single unitary skeleton structure when the digital clay device is fabricated.

Figure 4G:
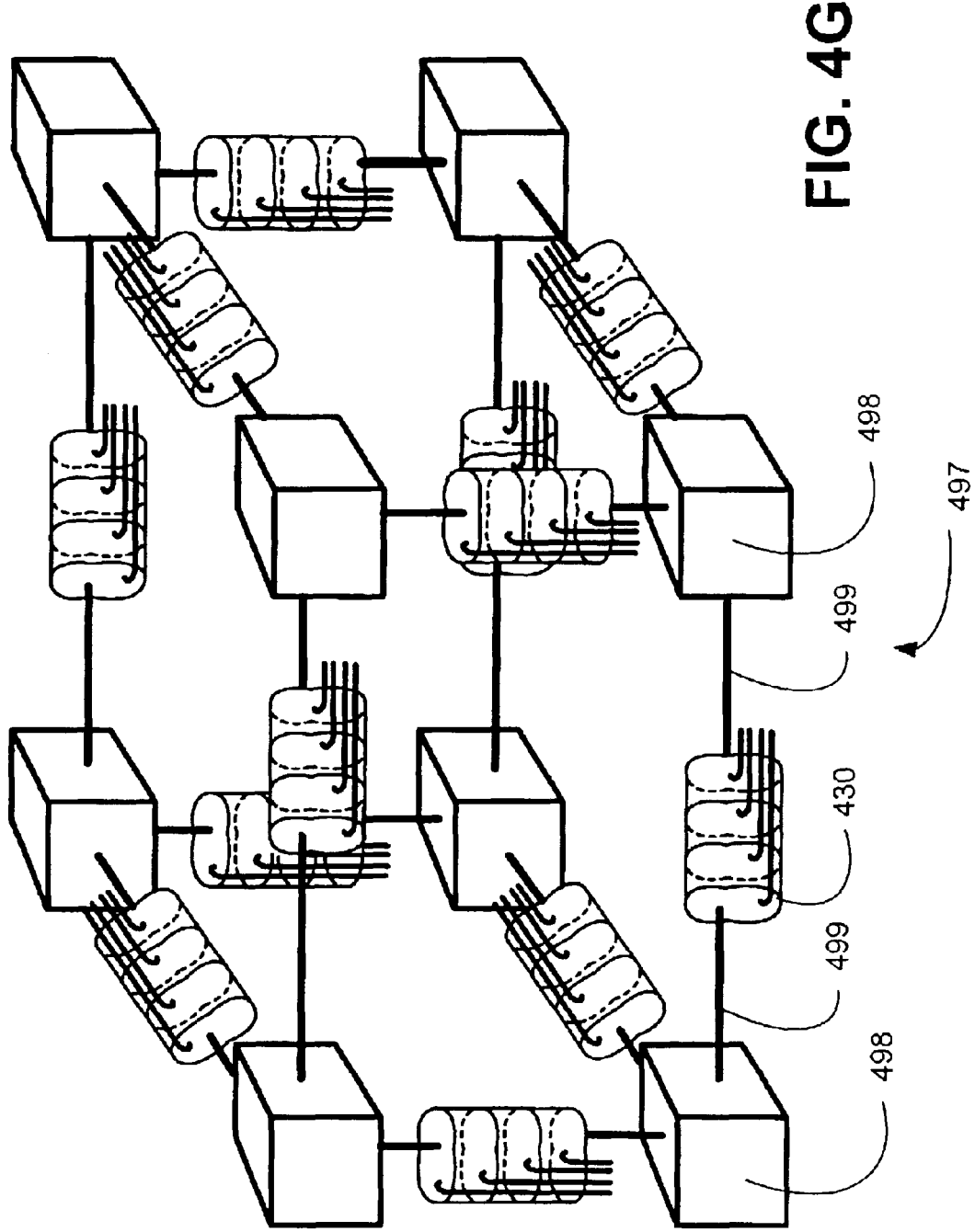

FIG. 4G illustrates an embodiment employing a plurality of bladder units 430 (see also FIG. 4C) to control a skeleton structure portion 497. Skeleton structure portion 497 is comprised of a plurality of points 498 and optional members 499. Points 498 are comprised of a flexible connector providing for multiple degrees of freedom of movement, such as a pin or flexible portion of a continuos structure, as described in greater detail herein.

For convenience, the skeleton structure portion 497 is illustrated as a rectangular structure having eight points 498. However, it is understood that the skeleton structure may have any number of points 498, thereby creating a skeleton structure portion 497 of any desirable size or shape. Also, for convenience, points 498 are illustrated as cubic structures.

The points 498 may be formed in any suitable shape or configuration. Furthermore, the bladder units are illustrated for convenience as being coupled to the cube shaped points 498 in a direction normal to the faces of the cube shaped points 498. It is understood that bladder units 430 may be connected across diagonals of the skeleton structure portion 497, or even between non-adjacent points 498 (when a larger matrix of points 498 comprise the skeleton structure portion 497). Accordingly, the selection of the points 498 with a bladder unit 430 is a preference made at the time of design and/or fabrication of the skeleton structure portion 497.

In one embodiment, the outside surface of skeleton structure portion 497, or portions thereof, is covered with a digital clay surface 108 (FIG. 1A). As noted above, the elasticity and texture of the digital clay surface 108 can be selected to suit a particular embodiment.

As illustrated in FIG. 4G, a point 498 is coupled to one or more bladder units 430. Thus, it is understood that the position of any point is controllable and/or determinable by embodiments of the present invention. As described above, optional members 499 couple the ends of the bladder units 430 to a point 498. As fluid is added to the bladders of bladder unit 430, a force is exerted onto its respective point 498 such that the position of the respective point 498 is moved. Similarly, as fluid is removed from the bladders of bladder unit 430, a force is exerted onto its respective point 498 such that the position of the point 498 is moved. Furthermore, if an external force is applied to any point 498, the skeleton structure portion 497 and positions of the points 498 are moved such that a corresponding force is generated on the respective bladder units 430. The force on the bladder units 430 causes fluid to be expelled, as described above, such that the new positions of the points 498 are determinable.

The various embodiments of the skeleton structure(s) described herein provide kinematic constraints to the motion of the bladders and/or bladder units in the digital clay device. Measurement of the volume of fluid in each bladder, along with a solution of the kinematics of the skeleton structure, allows the unambiguous determination of the position of the outermost surface of the digital clay device, thereby leading externally to a predictable digital clay surface shape.

The skeleton structure, in one embodiment, is formed from a scaffolding structure fabricated using stereolithorgraphy (SLA). The skeleton structure is fabricated to support active and passive motion in a very large number of degrees of freedom. Thus, the skeleton structure is a 3-D deformable structure. A SLA scaffolding structure employs a process of building the 3-D skeleton structure by selectively curing photopolymer with an ultraviolet (UV) laser. Accordingly, a skeleton structure fabricated using SLA technologies includes the capability to build portions of the skeleton using any desired arbitrary shape. Intricate interior structures wherein bladders, pipes and skeleton portions may be fabricated as a unit. Also, a skeleton structure fabricated using SLA technologies implements compliant (flexible) joints (hinges) by varying the thickness of interior connections in the skeleton structure. Furthermore, a skeleton structure fabricated using SLA technologies provides for the insertion of sensors during the skeleton structure fabrication process in another embodiment.

As described herein, the skeleton structure may be configured using any suitable geometry. Simplified, non-limiting illustrative geometries have been described above in FIGS. 4A–G, and elsewhere herein. Very complex geometries may be used to form the skeleton structure (or portions thereof). One embodiment employs a variable geometry truss (VGT). A VGT is a truss structure that actively deforms by changing the lengths of selected links. Accordingly, a skeleton structure employing VGT portions provides for folding structure portions that are easily deformed. For example, but not limited to, a VGT comprised of stacked octahedral truss structures can be completely folded away by actuating the length of selected lateral members by a small amount. Such a VGT structure employed in a digital clay device is advantageous since a small bladder movement results in a very large change of digital clay volume, thus allowing the digital clay device to undergo very large deformations.

Figure 5:
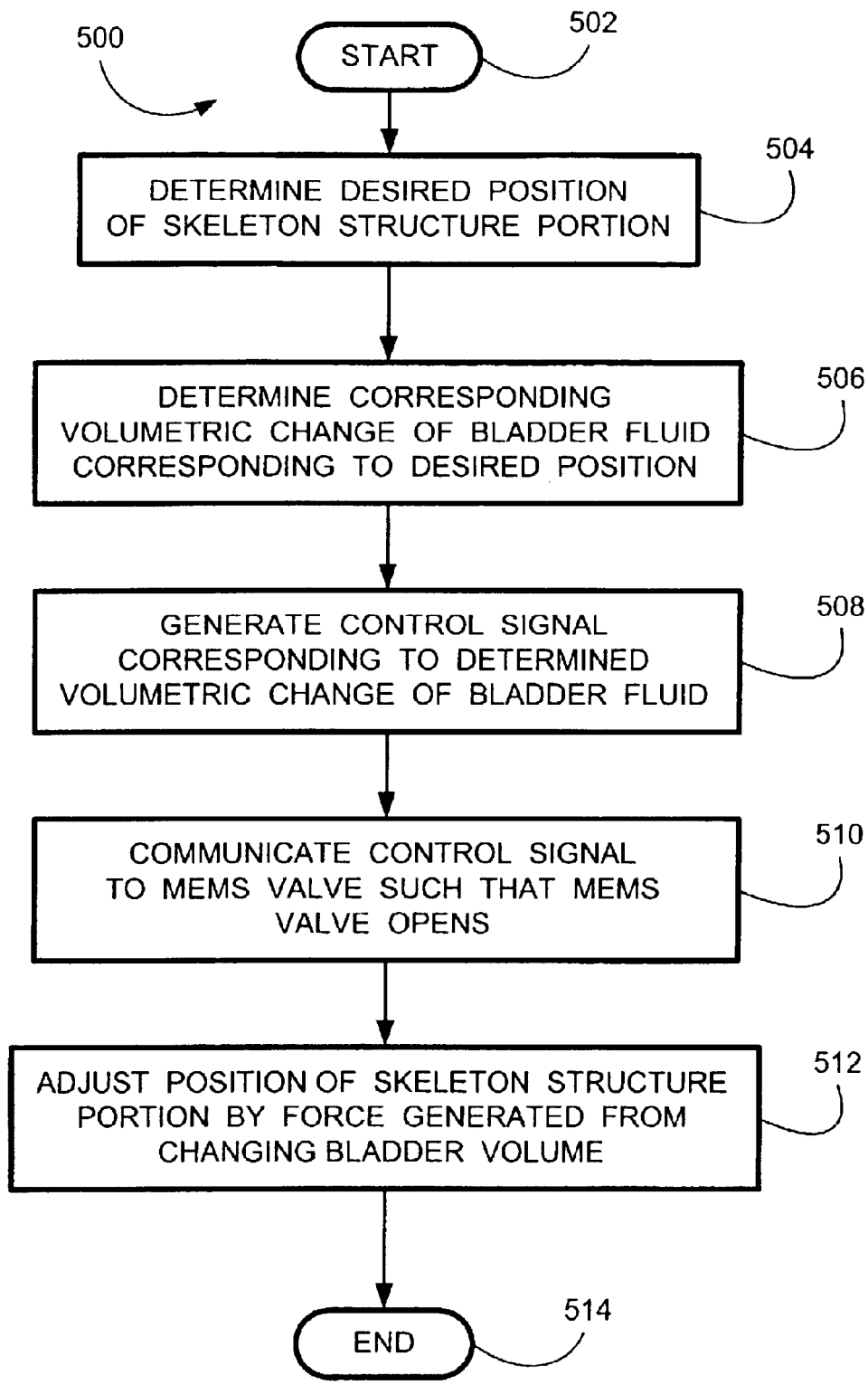
FIGS. 5 and 6 are flowcharts illustrating processes used by an embodiment of the digital clay device to adjust the position of a skeleton structure portion.
Figure 6:
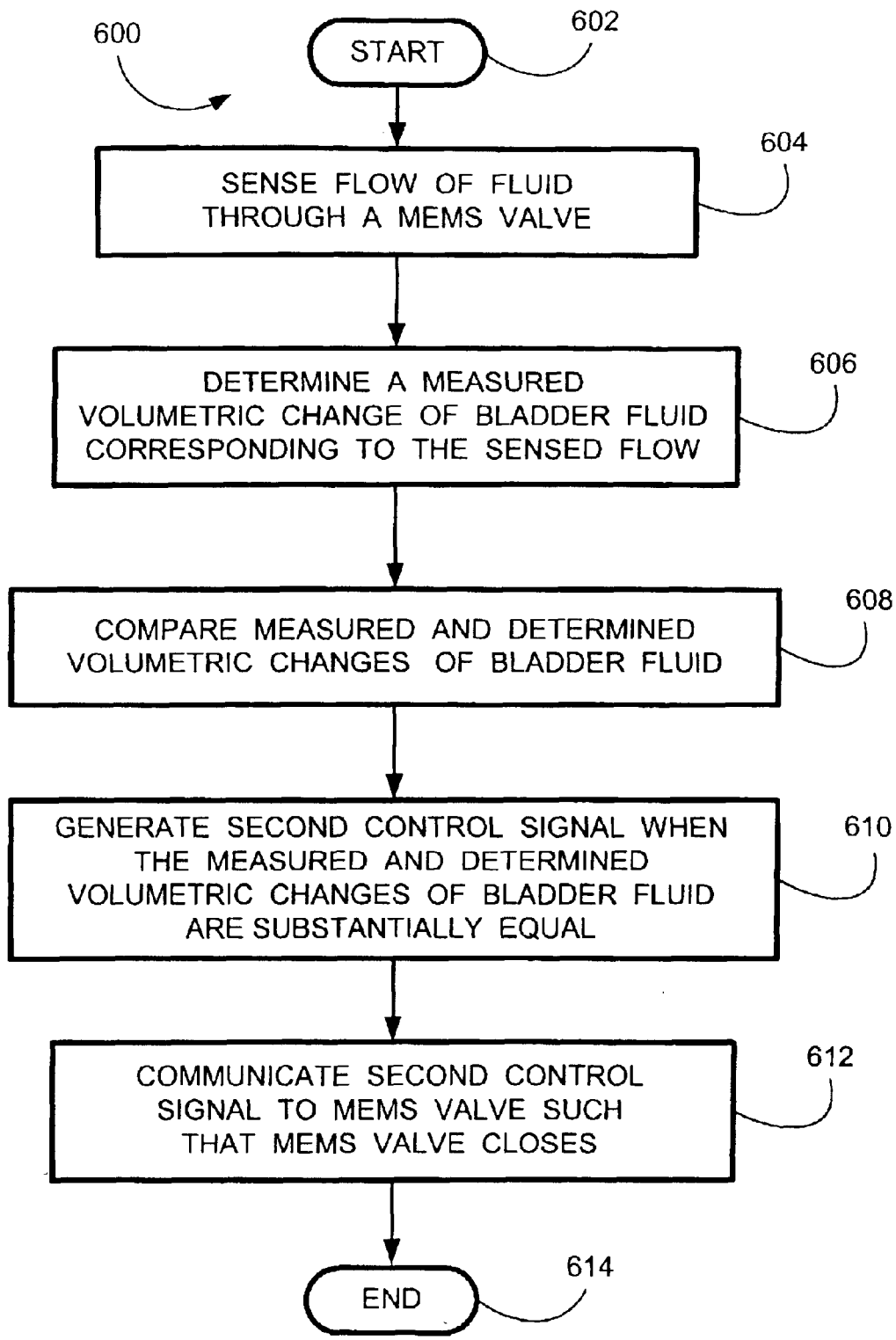

FIGS. 5 and 6 are flow charts 500 and 600, respectively, illustrating processes used by an embodiment of the digital clay device to adjust the position of a skeleton structure portion. The flow charts 500 and 600 show the architecture, functionality, and operation of a possible implementation of the software for implementing the digital clay logic 252 (FIGS. 2 and 3). In this regard, each block may represent a module, segment, or portion of code, which comprises one or more executable instructions for implementing the specified logical function(s). It should also be noted that in some alternative implementations, the functions noted in the blocks may occur out of the order noted in FIGS. 5 and/or 6, and/or may include additional functions, without departing significantly from the functionality of the present invention. For example, two blocks shown in succession in FIGS. 5 and/or 6 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure for the digital clay device and to be protected by the accompanying claims.

The flow chart 500 of FIG. 5 starts at block 502. At block 504 a desired position of a skeleton structure portion residing in the digital clay device is determined. At block 506 a volumetric change of a fluid residing in a bladder, the determined volumetric change corresponding to the determined desired position of the skeleton structure portion, is determined. At block 508 a control signal corresponding to the determined volumetric change is generated. At block 510 the control signal is communicated to a MEMS valve such that the MEMS valve opens so that the fluid flows through the MEMS valve thereby causing the determined volumetric change of the fluid residing in the bladder. At block 512 the position of the skeleton structure portion is adjusted corresponding to the desired position of the skeleton structure portion, the position adjustment caused by a force generated by the bladder on the skeleton structure portion when the volume of the bladder changes in response to the determined volumetric change of the fluid residing in the bladder. The process ends at block 514.

The flow chart 600 of FIG. 6 starts at block 602. At block 604 flow of the fluid through the MEMS valve is sensed. At block 606 a measured volumetric change in the fluid from the sensed flow is determined. At block 608 the measured volumetric change and the determined volumetric change are compared. At block 610 a second control signal is generated when the measured volumetric change substantially equals the determined volumetric change. At block 612 the second control signal is communicated to the MEMS valve such that the MEMS valve closes so that the fluid flow through the MEMS valve stops. The process ends at block 614.

The flow charts 500 and 600 describe processes for controlling flow into or out of one bladder. It is understood that the processes are equally applicable to a selected plurality of bladders. When flow of fluid into and out of a plurality of selected bladders are controlled in a coordinated manner by the present invention as described above, the volume and shape of the digital clay device is controllable.

Figure 7:
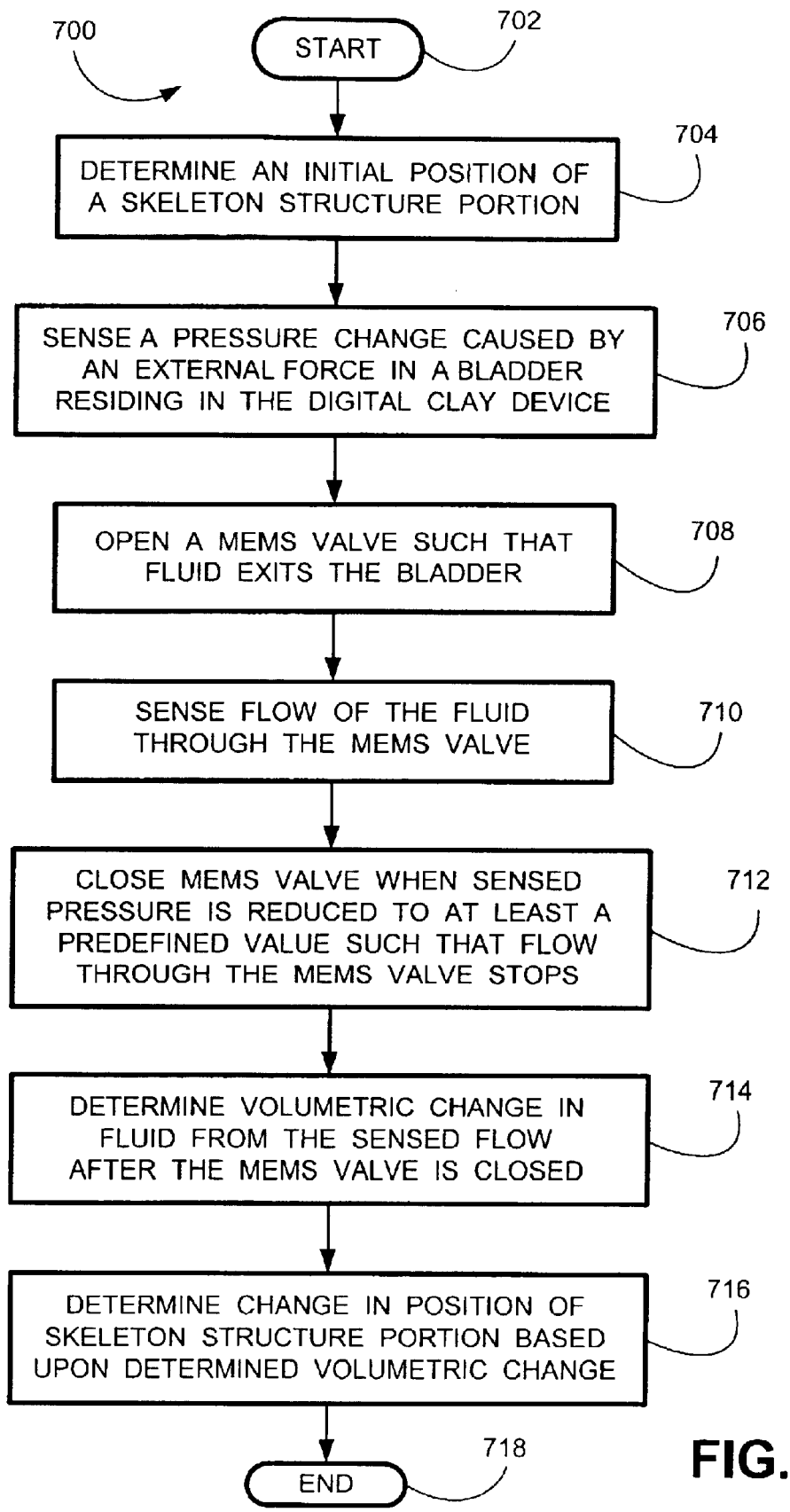
FIG. 7 is a flow chart illustrating processes used by an embodiment of the digital clay device to sense the position of a skeleton structure portion.

FIG. 7 is a flow chart 700 illustrating processes used by an embodiment of the digital clay device to sense the position of a skeleton structure portion. The flow chart 700 shows the architecture, functionality, and operation of a possible implementation of the software for implementing the digital clay logic 252 (FIGS. 2 and 3). In this regard, each block may represent a module, segment, or portion of code, which comprises one or more executable instructions for implementing the specified logical function(s). It should also be noted that in some alternative implementations, the functions noted in the blocks may occur out of the order noted in FIG. 7 and/or may include additional functions without departing significantly from the functionality of the present invention. For example, two blocks shown in succession in FIG. 7 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure for the digital clay device and to be protected by the accompanying claims.

The flow chart 700 of FIG. 7 starts at block 702. At block 704 an initial position of a skeleton structure portion residing in the digital clay device is determined. The initial position can be determined from a predefined position that the skeleton structure portion has been preset prior to application of an external force. Or, the initial position can be determined from a prior state.

At block 706 a pressure change on a bladder, the pressure change corresponding to an external force applied to the exterior portion of the digital clay device is sensed. At block 708 a MEMS valve is opened in response to the sensed pressure change such that fluid residing in the bladder exits the bladder. At block 710 flow of the fluid through the MEMS valve is sensed. At block 712 the MEMS valve is closed when the sensed pressure is reduced to at least a predefined value such that flow of the fluid through the MEMS valve stops. The reduced pressure results from the exit of fluid from the bladder. At block 714 a volumetric change in the fluid from the sensed flow after the MEMS valve is closed is determined. At block 716 a change in the position of the skeleton structure portion is determined based upon determining a volumetric change. The process ends at block 718.

The flow chart 700 describes a process for determining the change in position of a portion of a skeleton structure based upon flow out of one bladder. It is understood that the process is equally applicable to determining the change in position of a plurality of skeleton structure portions by sensing flow out of a plurality of bladders. When flow of fluid out of a plurality of bladders are sensed in a coordinated manner by the present invention as described above, the shape of the digital clay is determinable.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for controlling shape of a digital clay device, the method comprising the steps of:

determining a desired position of a skeleton structure portion residing in the digital clay device;

determining a volumetric change of a fluid residing in a bladder, the determined volumetric change corresponding to the determined desired position of the skeleton structure portion;

opening a micro-electro mechanical systems (MEMS) valve so that the fluid flows through the MEMS valve thereby causing the determined volumetric change of the fluid residing in the bladder; and adjusting a position of the skeleton structure portion corresponding to the desired position of the skeleton structure portion, the position adjustment caused by a force generated by the bladder on the skeleton structure portion when the volume of the bladder changes in response to the determined volumetric change of the fluid residing in the bladder.

2. The method of claim 1, further comprising the steps of:

sensing flow of the fluid through the MEMS valve;

determining a measured volumetric change in the fluid from the sensed flow;

comparing the measured volumetric change to the determined volumetric change; and closing the MEMS valve so that the fluid flow through the MEMS valve stops when the measured volumetric change substantially equals the determined volumetric change.

3. The method of claim 2, wherein the step of sensing flow further comprises the step of sensing a pressure difference across the MEMS valve, and wherein the step of determining the measured volumetric change further comprises the step of calculating a flow rate of the fluid through the MEMS valve based upon the sensed pressure difference.

4. The method of claim 1, further comprising the steps of:

determining a plurality of volumetric changes of fluid residing in a plurality of bladders such that the sum of the determined plurality of volumetric changes corresponds to the determined desired position of the skeleton structure portion; and opening a corresponding plurality of MEMS valves so that fluid flows through the MEMS valve thereby causing the determined volumetric change of the fluid residing in the corresponding bladders.

5. The method of claim 4, further comprising the steps of:

sensing flow of fluid through each one of the plurality of MEMS valves;

determining a plurality of measured volumetric changes in the fluid from the sensed flows;

comparing each one of the plurality of measured volumetric changes to a corresponding one of the determined volumetric changes; and closing the plurality of MEMS valves when the corresponding one of the measured volumetric changes substantially equals the corresponding determined volumetric change.

6. The method of claim 1, further comprising the steps of:
opening a first MEMS valve so that the fluid flows through the first MEMS valve thereby causing fluid to flow into the bladder when the determined volumetric change increases an amount of fluid residing in the bladder; and
opening a second MEMS valve so that the fluid flows through the second MEMS valve thereby causing fluid to flow out of the bladder when the determined volumetric change decreases the amount of fluid residing the bladder.

7. The method of claim 1, further comprising the steps of:
opening the MEMS valve to a first position so that the fluid flows through the MEMS valve thereby causing fluid to flow into the bladder when the determined volumetric change increases an amount of fluid residing in the bladder; and
opening to the MEMS valve to a second position so that the fluid flows through the MEMS valve thereby causing fluid to flow out of the bladder when the determined volumetric change decreases the amount of fluid residing in the bladder.

8. A method for sensing shape of a digital clay device, the method comprising the steps of:
determining an initial position of a skeleton structure portion residing in the digital clay device;
sensing a pressure change in a bladder, the pressure change corresponding to an external force applied to an exterior portion of the digital clay device;
opening a micro-electro mechanical systems (MEMS) valve in response to the sensed pressure change such that fluid residing in the bladder exits the bladder;
sensing flow of the fluid through the MEMS valve;
closing the MEMS valve when the sensed pressure is reduced to at least a predefined value, the reduced pressure resulting from the exit of fluid from the bladder, such that flow of the fluid through the MEMS valve stops;
determining a volumetric change in the fluid from the sensed flow after the MEMS valve is closed; and
determining a change in the position of the skeleton structure portion based upon the determined volumetric change.

9. The method of claim 8, further comprising the step of returning the skeleton structure portion to a predetermined position such that the step of determining the initial position of the skeleton structure portion is based upon the predetermined position.

10. The method of claim 8, further comprising the step of retrieving information corresponding to a previous position of the skeleton structure portion such that the step of determining the initial position of the skeleton structure portion is based upon the previous position.

11. The method of claim 8, further comprising the steps of:
determining a plurality of initial positions for each one of a plurality of skeleton structure portions residing in the digital clay device;
sensing a pressure change in a plurality of bladders, the pressure change corresponding to the external force applied to the exterior portion of the digital clay device;
opening a plurality of MEMS valves in corresponding ones of the plurality of bladders in response to the sensed pressure change such that fluid residing in the bladders exits the bladders;
sensing flow of the fluid through each one of the corresponding MEMS valves;
closing each one of the corresponding MEMS valves when the sensed pressure in each one of the corresponding bladders is reduced to at least a predefined value, the reduced pressure resulting from the exit of fluid from the bladders;
determining a volumetric change in the fluid from the sensed flow in each one of the corresponding MEMS valves after the MEMS valves are closed; and
determining a change in the position of the skeleton structure portions based upon the determined volumetric changes.

12. A system which controls a surface of a digital clay device, comprising:
a processor system;
a plurality of cells, each one of the plurality of cells further comprising:
at least one bladder, the bladder configured to hold a bladder fluid;
at lease one micro-electro mechanical systems (MEMS) valve, the valve controlled by the processor system; and
at least one sensor coupled to the MEMS valve, the sensor configured to sense flow of a fluid through the MEMS valve such that a volumetric change in the bladder fluid is determinable by the processor system; and
a covering having a plurality of surface portions, the covering being flexible and forming the surface of the digital clay device, each one of the surface portions coupled to selected ones of the plurality of cells such that a position of each one of the plurality of surface portions is controllable and determinable, the position of each one of the plurality of surface portions corresponding to an amount of bladder fluid in selected ones of the bladders.

13. The system of claim 12, wherein each one of the cells further comprises a skeleton structure portion configured to kinematically constrain movement of the bladder in a predetermined direction.

14. The system of claim 12, further comprising a skeleton structure configured to kinematically constrain movement of each one of the bladders residing in the cells in a predetermined direction.

15. The system of claim 12, wherein each one of the cells further comprises a backplate portion where the at least one MEMS valve and the at least one sensor reside.

16. The system of claim 12, further comprising a backplate, wherein each one of the MEMS valves and the sensors reside.

17. The system of claim 12, wherein at least one of the cells comprises a single MEMS valve and a single sensor, the single MEMS valve configured to open in a first position such that fluid flows into the bladder, and further configured to open in a second position such that fluid flows out of the bladder.

18. The system of claim 12, wherein at least one of the cells comprises:
a first MEMS valve configured to open in a first position such that fluid flows into the bladder;
a first sensor coupled to the first MEMS valve, the first sensor configured to sense flow of a fluid through the first MEMS valve such that a volumetric increase in the bladder fluid is determinable by the processor system;
the second MEMS valve configured to open in a second position such that fluid flows out of the bladder; and a second sensor coupled to the second MEMS valve, the
second sensor configured to sense flow of a fluid
through the second MEMS valve such that a volumetric
decrease in the bladder fluid is determinable by the
processor system.

19. The system of claim 12, further comprising a high
pressure reservoir, the high pressure reservoir having a
pressure greater than a bladder pressure of the bladder such
that when a corresponding MEMS valve coupled between
the bladder and the high pressure reservoir is opened, fluid
flows from the high pressure reservoir into the bladder.

20. The system of claim 12, further comprising a low
pressure reservoir, the low pressure reservoir having a
pressure less than a bladder pressure of the bladder such that
when a corresponding MEMS valve coupled between the
bladder and the low pressure reservoir is opened, fluid flows
from the bladder into the low pressure reservoir.

21. A system for sensing shape of a digital clay device,
comprising:
means for determining a desired position of a skeleton
structure portion residing in the digital clay device;
means for determining a volumetric change of a fluid
residing in a bladder, the determined volumetric change
corresponding to the determined desired position of the
skeleton structure portion;
means for generating a control signal corresponding to the
determined volumetric change;
means for communicating the control signal to a micro-
electro mechanical systems (MEMS) valve such that
the MEMS valve opens so that the fluid flows through
the MEMS valve thereby causing the determined volu-
metric change of the fluid residing in the bladder; and
means for adjusting a position of the skeleton structure
portion corresponding to the desired position of the
skeleton structure portion, the position adjustment
caused by a force generated by the bladder on the
skeleton structure portion when the volume of the
bladder changes in response to the determined volu-
metric change of the fluid residing in the bladder.

22. The system of claim 21, further comprising:
means for sensing flow of the fluid through the MEMS
valve;
means for determining a measured volumetric change in
the fluid from the sensed flow;
means for comparing the measured volumetric change to
the determined volumetric change;
means for generating a second control signal when the
measured volumetric change substantially equals the
determined volumetric change; and
means for communicating the second control signal to the
MEMS valve such that the MEMS valve closes so that
the fluid flow through the MEMS valve stops.

23. The system of claim 22, wherein the means for
sensing flow further comprises means for sensing a pressure
difference across the MEMS valve, and wherein the means
for determining the measured volumetric change further
comprises means for calculating a flow rate of the fluid
through the MEMS valve based upon the sensed pressure
difference.

24. The system of claim 21, further comprising:
means for determining a plurality of volumetric changes
of fluid residing in a plurality of bladders such that the
sum of the determined plurality of volumetric changes
corresponding to the determined desired position of the
skeleton structure portion;

means for generating a plurality of control signals, each
one of the plurality of control signals corresponding to
one of the determined volumetric changes; and
means for communicating each one of the plurality of
control signals to a corresponding plurality of MEMS
valves such that each one of the MEMS valves opens
so that fluid flows through the MEMS valve thereby
causing the determined volumetric change of the fluid
residing in the corresponding bladders.

25. The system of claim 24, further comprising:
means for sensing flow of fluid through each one of the
plurality of MEMS valves;
means for determining a plurality of measured volumetric
changes in the fluid from the sensed flows;
means for comparing each one of the plurality of mea-
sured volumetric changes to a corresponding one of the
determined volumetric changes;
means for generating a plurality of second control signals,
each one of the plurality of second control signals
corresponding to one of the measured volumetric
changes, and wherein each one of the corresponding
second control signals is generated when the corre-
sponding one of the measured volumetric changes
substantially equals the corresponding determined
volumetric change; and
means for communicating each one of the plurality of
second control signals to a corresponding one of the
plurality of MEMS valves such that each one of the
plurality of MEMS valves close.

26. The system of claim 21, further comprising:
means for generating a first control signal corresponding
to the determined volumetric change when the deter-
mined volumetric change increases an amount of fluid
residing in the bladder;
means for communicating the first control signal to a first
MEMS valve such that the first MEMS valve opens so
that the fluid flows through the MEMS valve thereby
causing fluid to flow into the bladder;
means for generating a second control signal correspond-
ing to the determined volumetric change when the
determined volumetric change decreases the amount of
fluid residing in the bladder; and
means for communicating the second control signal to a
second MEMS valve such that the second MEMS valve
opens so that the fluid flows through the MEMS valve
thereby causing fluid to flow out of the bladder.

27. A computer readable medium having a program for
sensing shape of a digital clay device, the program com-
prising logic configured to perform the steps of:
determining a desired position of a skeleton structure
portion residing in the digital clay device;
determining a volumetric change of a fluid residing in a
bladder, the determined volumetric change correspond-
ing to the determined desired position of the skeleton
structure portion;
generating a control signal corresponding to the deter-
mined volumetric change;
communicating the control signal to a micro-electro
mechanical systems (MEMS) valve such that the
MEMS valve opens so that the fluid flows through the
MEMS valve thereby causing the determined volumet-
ric change of the fluid residing in the bladder; and
adjusting a position of the skeleton structure portion
corresponding to the desired position of the skeleton structure portion, the position adjustment caused by a force generated by the bladder on the skeleton structure portion when the volume of the bladder changes in response to the determined volumetric change of the fluid residing in the bladder.

28. A system which senses shape of a digital clay device, comprising:
means for determining an initial position of a skeleton structure portion residing in the digital clay device;
means for sensing a pressure change in a bladder, the pressure change corresponding to an external force applied to an exterior portion of the digital clay device;
means for opening a micro-electro mechanical systems (MEMS) valve in response to the sensed pressure change such that fluid residing in the bladder exits the bladder;
means for sensing flow of the fluid through the MEMS valve;
means for closing the MEMS valve when the sensed pressure is reduced to at least a predefined value, the reduced pressure resulting from the exit of fluid from the bladder, such that flow of the fluid through the MEMS valve stops;
means for determining a volumetric change in the fluid from the sensed flow after the MEMS valve is closed; and
means for determining a change in the position of the skeleton structure portion based upon the determined volumetric change.

29. The system of claim 28, further comprising means for returning the skeleton structure portion to a predetermined position such that the initial position of the skeleton structure portion is based upon the predetermined position.

30. The system of claim 28, further comprising means for retrieving information corresponding to a previous position of the skeleton structure portion such that the initial position of the skeleton structure portion is based upon the previous position.

31. The system of claim 28, further comprising:
means for determining a plurality of initial positions for each one of a plurality of skeleton structure portions residing in the digital clay device;
means for sensing a pressure change in a plurality of bladders, the pressure change corresponding to the external force applied to the exterior portion of the digital clay device;
means for opening a plurality of MEMS valves in corresponding ones of the plurality of bladders in response to the sensed pressure change such that fluid residing in the bladders exits the bladders;
means for sensing flow of the fluid through each one of the corresponding MEMS valves;
means for closing each one of the corresponding MEMS valves when the sensed pressure in each one of the corresponding bladders is reduced to at least a predefined value, the reduced pressure resulting from the exit of fluid from the bladders;
means for determining a volumetric change in the fluid from the sensed flow in each one of the corresponding MEMS valves after the MEMS valves are closed; and
means for determining a change in the position of the skeleton structure portions based upon the determined volumetric changes.

32. A computer readable medium having a program for sensing shape of a digital clay device, the program comprising logic configured to perform the steps of:
determining an initial position of a skeleton structure portion residing in the digital clay device;
sensing a pressure change in a bladder, the pressure change corresponding to an external force applied to an exterior portion of the digital clay device;
opening a micro-electro mechanical systems (MEMS) valve in response to the sensed pressure change such that fluid residing in the bladder exits the bladder;
sensing flow of the fluid through the MEMS valve;
closing the MEMS valve when the sensed pressure is reduced to at least a predefined value, the reduced pressure resulting from the exit of fluid from the bladder, such that flow of the fluid through the MEMS valve stops;
determining a volumetric change in the fluid from the sensed flow after the MEMS valve is closed; and
determining a change in the position of the skeleton structure portion based upon the determined volumetric change.

33. A method for controlling shape of a surface using a digital clay device, the method comprising the steps of:
determining a desired position of at least one surface portion;
determining a volumetric change of a fluid residing in a bladder, the determined volumetric change corresponding to the determined desired position of the surface portion;
opening a micro-electro mechanical systems (MEMS) valve so that the fluid flows through the MEMS valve thereby causing the determined volumetric change of the fluid residing in the bladder; and
adjusting a position of the surface portion corresponding to the desired position of the surface portion, the position adjustment caused by a force generated by the bladder when the volume of the bladder changes in response to the determined volumetric change of the fluid residing in the bladder.

34. The method of claim 33, further comprising the steps of:
sensing flow of the fluid through the MEMS valve;
determining a measured volumetric change in the fluid from the sensed flow; comparing the measured volumetric change to the determined volumetric change; and
closing the MEMS so that the fluid flow through the MEMS valve stops.

35. The method of claim 34, wherein the step of sensing flow further comprises the step of sensing a pressure difference across the MEMS valve, and wherein the step of determining the measured volumetric change further comprises the step of calculating a flow rate of the fluid through the MEMS valve based upon the sensed pressure difference.

36. The method of claim 33, further comprising the steps of:
determining a plurality of volumetric changes of fluid residing in a plurality of bladders such that the sum of the determined plurality of volumetric changes corresponds to the determined desired position of the surface portion; and
opening a corresponding plurality of MEMS valves so that fluid flows through the MEMS valve thereby causing the determined volumetric change of the fluid residing in the corresponding bladders.

37. The method of claim 36, further comprising the steps of:
   sensing flow of fluid through each one of the plurality of MEMS valves;
   determining a plurality of measured volumetric changes in the fluid from the sensed flows;
   comparing each one of the plurality of measured volumetric changes to a corresponding one of the determined volumetric changes; and
   closing the corresponding ones of the plurality of MEMS valves when the corresponding ones of the measured volumetric changes substantially equals the corresponding determined volumetric change.

38. The method of claim 33, further comprising the steps of:
   opening the MEMS valve to a first position so that the fluid flows into the bladder when the determined volumetric change increases an amount of fluid residing in the bladder; and
   opening the MEMS valve to a second position so that the fluid flows out of the bladder when the determined volumetric change decreases the amount of fluid residing in the bladder.

39. A method for sensing shape of a surface using a digital clay device, the method comprising the steps of:
   determining an initial position of a surface portion;
   sensing a pressure change in a bladder, the pressure change corresponding to an external force applied to the surface portion;
   opening a micro-electro mechanical systems (MEMS) valve in response to the sensed pressure change such that fluid residing in the bladder exits the bladder;
   sensing flow of the fluid through the MEMS valve;
   closing the MEMS valve when the sensed pressure is reduced to at least a predefined value, the reduced pressure resulting from the exit of fluid from the bladder, such that flow of the fluid through the MEMS valve stops;
   determining a volumetric change in the fluid from the sensed flow after the MEMS valve is closed; and
   determining a change in the position of the surface portion based upon the determined volumetric change.

40. The method of claim 39, further comprising the step of returning the surface portion to a predetermined position such that the step of determining the initial position of the surface portion is based upon the predetermined position.

41. The method of claim 39, further comprising the step of retrieving information corresponding to a previous position of the surface portion such that the step of determining the initial position of the surface portion is based upon the previous position.

42. The method of claim 39, further comprising the steps of:
   determining a plurality of initial positions for each one of a plurality of surface portions;
   sensing a pressure change in a plurality of bladders, the pressure change corresponding to the external force applied to the surface portions;
   opening a plurality of MEMS valves in corresponding ones of the plurality of bladders in response to the sensed pressure change such that fluid residing in the bladders exits the bladders;
   sensing flow of the fluid through each one of the corresponding MEMS valves;
   closing each one of the corresponding MEMS valves when the sensed pressure in each one of the corresponding bladders is reduced to at least a predefined value, the reduced pressure resulting from the exit of fluid from the bladders;
   determining a volumetric change in the fluid from the sensed flow in each one of the corresponding MEMS valves after the MEMS valves are closed; and
   determining a change in the position of the surface portions based upon the determined volumetric changes.

* * * * *

UNITED STATES PATENT AND TRADEMARK OFFICE
CERTIFICATE OF CORRECTION

PATENT NO.    : 6,836,736 B2
DATED         : December 28, 2004
INVENTOR(S)   : Allen et al.

It is certified that error appears in the above-identified patent and that said Letters Patent is hereby corrected as shown below:

Column 1,
Line 11, add the following paragraph:
-- STATEMENT REGARDING FEDERALLY SPONSORED RESEARCH OR DEVELOPMENT
The U.S. Government has a paid-up license in this invention and the right in limited circumstances to require the patent owner to license to others on reasonable terms as provided for by the terms of Contract No. IIS-0121663, awarded by the National Science Foundation. --.

Signed and Sealed this

Sixteenth Day of August, 2005

JON W. DUDAS
*Director of the United States Patent and Trademark Office*